United States Patent
Nomura

(10) Patent No.: US 9,036,219 B2
(45) Date of Patent: May 19, 2015

(54) IMAGE PROCESSING DEVICE AND IMAGE PROCESSING METHOD FOR PREVENTING IMAGE QUALITY DETERIORATION

(71) Applicant: Konica Minolta, Inc., Chiyoda-ku (JP)

(72) Inventor: Shoichi Nomura, Machida (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/147,877

(22) Filed: Jan. 6, 2014

(65) Prior Publication Data

US 2014/0192387 A1 Jul. 10, 2014

(30) Foreign Application Priority Data

Jan. 10, 2013 (JP) ................................ 2013-002362

(51) Int. Cl.
*H04N 1/04* (2006.01)
*H04N 1/40* (2006.01)
*H04N 1/00* (2006.01)
*H04N 9/31* (2006.01)
*H04N 1/387* (2006.01)
*H04N 1/393* (2006.01)
*G06K 9/32* (2006.01)
*G06K 9/46* (2006.01)

(52) U.S. Cl.
CPC ....... *H04N 1/40068* (2013.01); *H04N 1/00681* (2013.01); *H04N 1/00718* (2013.01); *H04N 1/0074* (2013.01); *H04N 9/3188* (2013.01); *G06K 9/3283* (2013.01); *G06K 9/4638* (2013.01); *H04N 1/3878* (2013.01); *H04N 1/393* (2013.01)

(58) Field of Classification Search
None
See application file for complete search history.

(56) References Cited

U.S. PATENT DOCUMENTS

| | | | | |
|---|---|---|---|---|
| 5,535,007 A * | 7/1996 | Kim | ............................... | 358/296 |
| 7,525,674 B2 * | 4/2009 | Otani et al. | ..................... | 358/1.1 |
| 2007/0097467 A1* | 5/2007 | Inamoto | ........................ | 358/518 |
| 2009/0148055 A1* | 6/2009 | Kurigata | ....................... | 382/235 |
| 2012/0243052 A1* | 9/2012 | Kakutani | ..................... | 358/3.13 |
| 2013/0070308 A1* | 3/2013 | Kurigata | ....................... | 358/451 |

FOREIGN PATENT DOCUMENTS

| | | |
|---|---|---|
| JP | 2006-270149 A | 10/2006 |
| JP | 2007-316154 A | 12/2007 |

* cited by examiner

*Primary Examiner* — Miya J Cato

(74) *Attorney, Agent, or Firm* — Buchanan Ingersoll & Rooney PC

(57) ABSTRACT

An image processing device includes an image-modification processing unit and an adjustment unit. The image-modification processing unit executes first image-modification processing wherein pixels are inserted to or deleted from a subject image in a first direction or pixels in the subject image are shifted in the first direction and second image modification processing wherein pixels in the subject image are shifted in a second direction. The adjustment unit adjusts a position of a shift-border along which the pixels are shifted in the second image-modification processing on the basis of a position of each step in an image caused in the first image-modification processing.

4 Claims, 24 Drawing Sheets

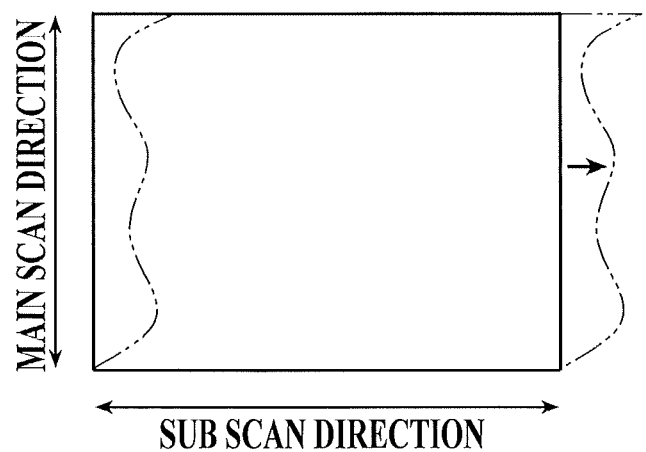
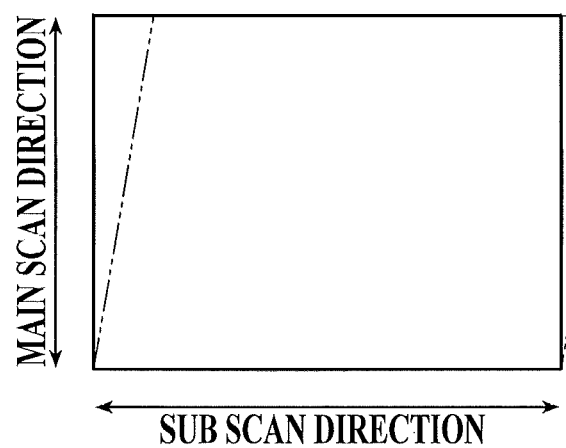
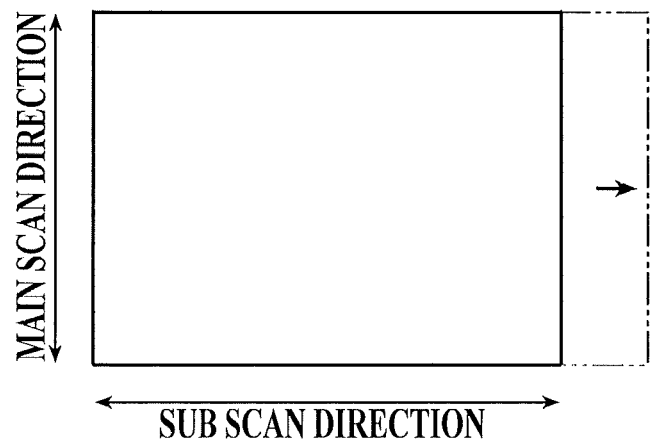

ORIGINAL IMAGE

PIXEL-DISPERSION TABLE

ENLARGED IMAGE

REDUCED IMAGE

DEFORMATION-CORRECTION AND
PIXEL-DISPERSION PROCESSING

SIMPLE DEFORMATION-CORRECTION
PROCESSING

ORIGINAL IMAGE

POSITION OF SHIFT-BORDER ↓

MAIN SCAN DIRECTION

MAIN SCAN DIRECTION

POSITION OF SHIFT-BORDER ↓

MAIN SCAN DIRECTION

MAIN SCAN DIRECTION

PIXEL-DISPERSION REFERENCE TABLE

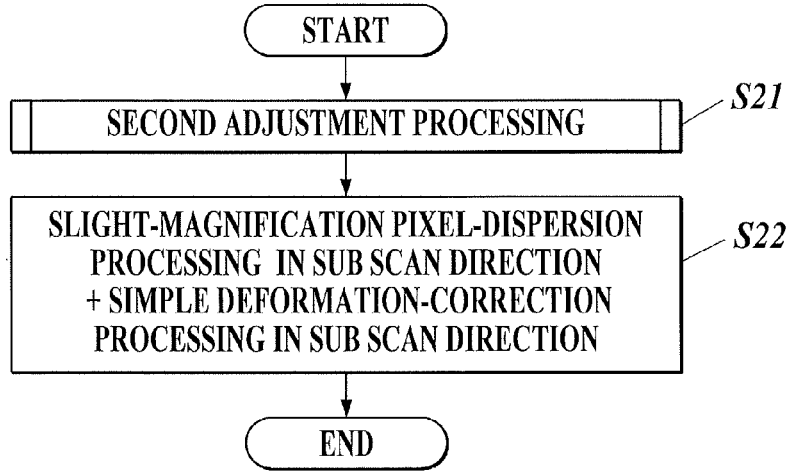
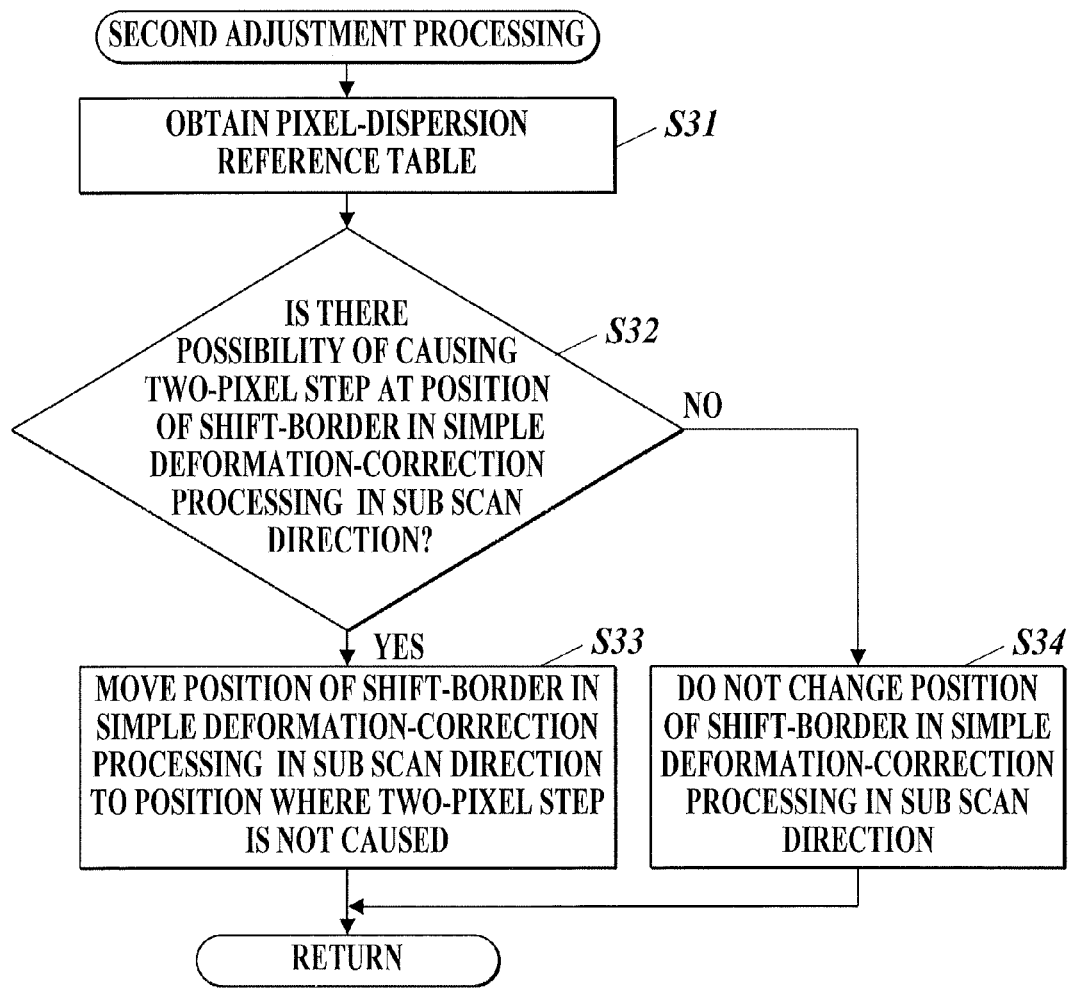

IMAGE PROCESSING DEVICE AND IMAGE PROCESSING METHOD FOR PREVENTING IMAGE QUALITY DETERIORATION

BACKGROUND OF THE INVENTION

1. Field of the Invention

The present invention relates to an image processing device and an image processing method.

2. Description of Related Art

A tandem color printer which forms binary images executes image-modification processing of modifying an image for correcting errors in register of colors, errors in register of marks or difference between images on the both sides of a sheet which is caused by shrinkage of a sheet. The nearest-neighbor method is one method used in the processing, but it often causes conspicuous deterioration of picture quality. Therefore, a method of partially using a halftone and pixel-dispersion processing are proposed.

For example, as a means for correcting positioning errors less than one-pixel width, the bilinear method which adjusts an exposure amount of each pixel has been used (see Japanese Patent Publication No. 2007-316154).

Also, an image forming device for correcting errors in register of colors by inserting or deleting pixels to modify an image is proposed (see Japanese Patent Publication No. 2006-270149). This device determines pixel-operation-positions to or from which pixels are inserted or deleted on the basis of predetermined arrangement-parameters.

These methods for correcting a variety of errors in register for a printer can be classified into magnification-correction and deformation-correction.

The magnification-correction is processing wherein pixels are inserted or deleted in a direction of enlarging or reducing an image. Positions where pixels are inserted or deleted vary with lines along the direction of enlarging or reducing the image. Thereby portions where pixels are inserted or deleted are not conspicuous.

The deformation-correction is processing of correcting deformation such as a skew or a bow which is caused by inclination; bend, etc. of a print head. This processing eliminates the deformation of an image. A skew is deformation which is caused when a horizontal or a vertical line is inclined. A bow is deformation which is caused when a straight line is bent.

However, in the magnification-correction and the deformation-correction, a step in an image is caused at a border along which pixels are shifted. Therefore, when the magnification-correction and the deformation-correction are executed individually and successively on an image, deterioration of picture quality is added up and may become too conspicuous to be ignored although deterioration of picture quality caused in each image-modification processing is relatively small. For example, after several kinds of image-modification processing are executed, roughness having two-pixel steps can be caused partially on edges.

Since images are two-dimensional, actual image-modification processing is executed two-dimensionally. When the magnification-correction and the deformation-correction are executed, it is effective to execute processing respectively in a main scan direction and in a sub scan direction for simplifying circuit configuration. Also in this case, a positional relation of defects in an image caused in the first image-modification processing can be changed in the next image-modification processing in a direction perpendicular to the direction in the first image-modification processing, which causes significant deterioration of picture quality.

SUMMARY OF THE INVENTION

It is an object of the present invention to solve the above problem. That is to prevent deterioration of picture quality when several kinds of image-modification processing are executed on an image.

In order to realize the above object, according to a first aspect of the present invention, there is provided an image processing device including an image-modification processing unit which executes first image-modification processing wherein pixels are inserted to or deleted from a subject image in a first direction or pixels in the subject image are shifted in the first direction and second image modification processing wherein pixels in the subject image are shifted in a second direction, and an adjustment unit which adjusts a position of a shift-border along which the pixels are shifted in the second image-modification processing on the basis of a position of each step in an image caused in the first image-modification processing.

Preferably, the second direction is the same as the first direction, and the adjustment unit adjusts the position of the shift-border such that a level difference of a step at the position of the shift-border in an image which is caused in the first image-modification processing is not widened in the second image-modification processing.

Preferably, the image processing device further includes a storage unit which stores a reference table in which each pixel position in a direction perpendicular to the first direction is related to reference pixel information which indicates which pixel in the subject image is referred to for a pixel value of an output image for each relative reference value, the output image being obtained by executing the first image-modification processing and/or the second image-modification processing on the subject image, wherein the relative reference value indicates a relative position in the subject image in relation to a position in the output image in the first direction, wherein the image-modification processing unit adds the relative reference value based on the second image-modification processing to the relative reference value based on the first image-modification processing for each pixel, obtains reference pixel information relating to the pixel position in the direction perpendicular to the first direction and to an added value of the relative reference values from the reference table stored in the storage unit, and executes the first image-modification processing and the second image-modification processing at the same time on the basis of the obtained reference pixel information.

Preferably, the first image-modification processing includes processing wherein pixels are inserted to or deleted from the subject image in the first direction such that positions to or from which pixels are inserted or deleted vary with lines along the first direction.

Preferably, the second image-modification processing includes processing wherein deformation is corrected in the second direction.

Preferably, the second direction is perpendicular to the first direction, and the adjustment unit adjusts the position of the shift-border such that the shift-border does not overlap with a portion which is included in an image obtained by executing the first image-modification processing on the subject image and which corresponds to a line extending in a direction substantially the same as the second direction in the subject image.

Preferably, the first image-modification processing includes processing wherein pixels are inserted to or deleted from the subject image in the first direction such that positions to or from which pixels are inserted or deleted vary with lines along the first direction.

Preferably, the first image-modification processing includes processing wherein pixels are shifted in the first direction to correct deformation in the first direction while positions of steps in an image caused by the shift of pixels are dispersed.

Preferably, the second image-modification processing includes processing wherein deformation is corrected in the second direction.

According to a second aspect of the present invention, there is provided an image processing method including an image-modification step of executing first image-modification processing wherein pixels are inserted to or deleted from a subject image in a first direction or pixels in the subject image are shifted in the first direction and second image modification processing wherein pixels in the subject image are shifted in a second direction, and an adjustment step of adjusting a position of a shift-border along which the pixels are shifted in the second image-modification processing on the basis of a position of each step in an image caused in the first image-modification processing.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 2A shows an example of slight magnification processing in the sub scan direction;

FIG. 2B shows an example of skew-correction processing in the sub scan direction;

FIG. 2C shows an example of skew-and-bow-correction processing in the sub scan direction;

FIG. 23 is a flowchart of image-modification processing according to the second embodiment;

FIG. 24 is a flowchart of the second adjustment processing;

DETAILED DESCRIPTION OF THE PREFERRED EMBODIMENT

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

First Embodiment

The first embodiment according to the present invention will be explained.

Figure 1:
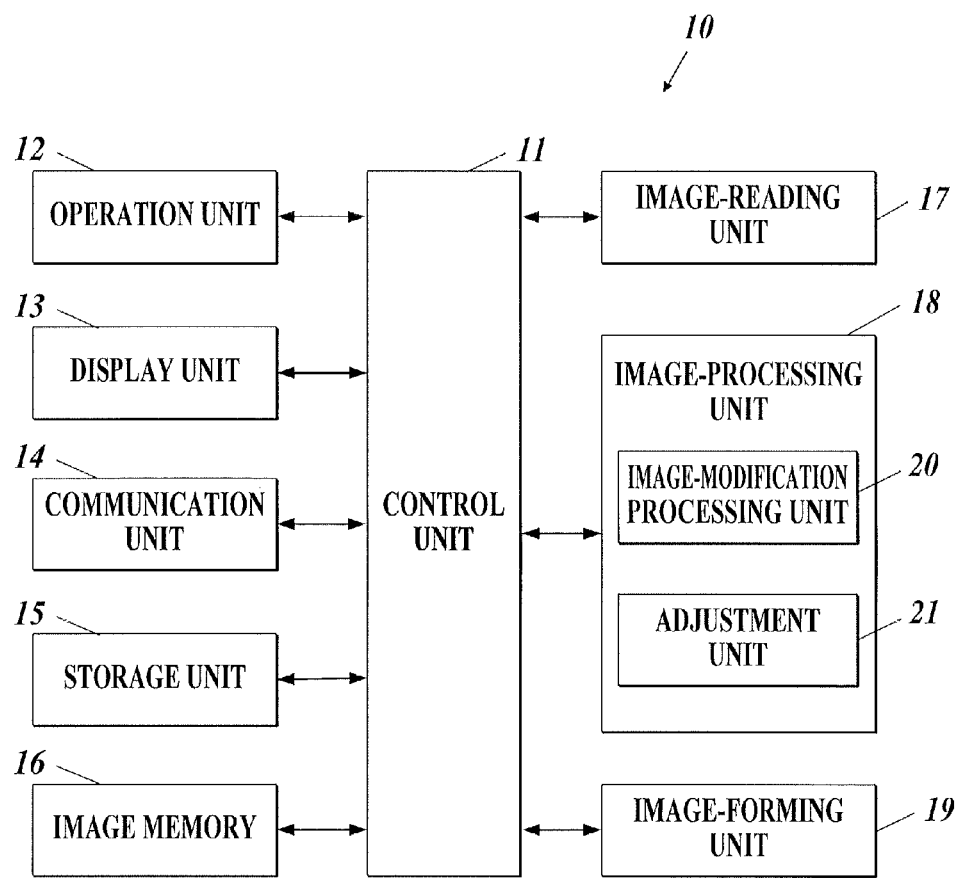
FIG. 1 is a block diagram showing configuration of an image processing device according to the first embodiment.

FIG. 1 shows configuration of an image processing device 10 according to the present invention. The image processing device 10 includes a control unit 11, an operation unit 12, a display unit 13, a communication unit 14, a storage unit 15, an image memory 16, an image-reading unit 17, an image-processing unit 18, an image-forming unit 19, etc.

The control unit 11 reads programs stored in the storage unit 15 and controls operation of each unit or the like in the image processing device 10 in cooperation with the programs to execute a variety of processing. The control unit 11 includes CPU (Central Processing Unit) and RAM (Random Access Memory).

The operation unit 12 includes operation keys, a touch panel, etc. and outputs operation signals to the control unit 11 in accordance with operation on the operation unit 12.

The display unit 13 includes a display and displays operation window, etc. in accordance with commands from the control unit 11.

The communication unit 14 sends/receives data to/from external devices connected via a network. For example, the communication unit 14 receives image data from an external device. The image data is stored in the image memory 16.

The storage unit 15 stores programs executed by the control unit 11, data necessary for executing programs, etc. For example, a hard disc, etc. can be used as the storage unit 15. The storage unit 15 also stores a detection pattern for detecting errors in register in the main scan direction and the sub scan direction.

The image memory 16 is a storage device which stores image data. For example, DRAM (Dynamic RAM), etc. can be used as the image memory 16.

The image-reading unit 17 includes a scanner, etc. and reads a document through optical scanning. The image-reading unit 17 executes A/D conversion on read signals obtained by reading the document to generate image data, and output the image data to the image memory 16.

The image-processing unit 18 reads image data from the image memory 16 and executes a variety of image processing on the image data. Image processing is, for example, color conversion processing, screen processing, etc. The image data after image processing is stored in the image memory 16 and is output to the image-forming unit 19.

Processing by the image-processing unit 18 is realized by software by cooperation of the programs stored in the storage unit 15 and the CPU of the control unit 11. It is also possible that the processing by the image-processing unit 18 is executed by hardware for exclusive use.

The image processing unit 18 also includes an image-modification processing unit 20 and an adjustment unit 21.

The image-modification processing unit 20 executes the first image-modification processing wherein pixels are inserted or deleted in the first direction to or from a subject image and the second image-modification processing wherein pixels in the subject image are shifted in the second direction.

The adjustment unit 21 adjusts a position of a shift-border along which the pixels are shifted in the second image modification processing on the basis of positions of steps caused in the first image-modification processing.

In the first embodiment, the second direction is the same as the first direction.

The adjustment unit 21 adjusts the position of the shift-border in the second image modification processing such that a level difference of a step at the position of the shift-border in an image which is caused in the first image-modification processing is not widened in the second image-modification processing.

The first image-modification processing includes processing wherein positions to or from which pixels are inserted or deleted are made to vary with lines along the first direction.

The second image-modification processing includes processing wherein deformation is corrected in the second direction.

The image-forming unit 19 forms an image on a sheet in the electrophotography method on the basis of image data in yellow (Y), magenta (M), cyan (C) and black (K) which is output from the image-processing unit 18. The image-forming unit 19 consists of a photosensitive drum, a charge unit which charges the photosensitive drum, an exposure unit which executes exposure-scan on the surface of the photosensitive drum on the basis of image data, a development unit which puts toner on the photosensitive drum, a transfer unit which transfers a toner image formed on the photosensitive drum to a sheet, a fixation unit which fixes the toner image formed on the sheet, etc.

The image-forming unit 19 forms a binary image. The binary image includes a binary ON/OFF pattern image in a narrow sense, an area modulation image, a pattern image which partially includes halftone and a multi-level screen image.

Deformation of an image formed by the image-forming unit 19 is caused by, for example, errors in adjusting an optical scan system, a toner transfer system, an image-output medium such as a paper or a positional relation between parts constituting the image-forming unit 19.

The image deformation processing can be roughly classified into slight magnification processing and deformation-correction processing.

FIG. 2A is an example of slight magnification processing in the sub scan direction. The slight magnification processing is accompanied with insertion or deletion of pixels for changing an area of an image. When an image is enlarged or reduced in the sub scan direction, pixels are inserted or deleted in the sub scan direction. The slight magnification means that the number of pixels inserted or deleted is relatively small in relation to the number of pixels in the whole image in a magnification direction. A magnification ratio in the magnification processing is 98% to 102% for example.

FIG. 2B and FIG. 2C are examples of deformation-correction processing in the sub scan direction. FIG. 2B is an example of skew-correction processing, and FIG. 2C is an example of complicated deformation-correction processing wherein skew-correction processing and bow-correction processing are mixed. In order to correct deformation in the sub scan direction, each pixel is shifted in the sub scan direction. The shift amount is determined in accordance with the pixel position in the main scan direction. Pixels that are not at the same position in the sub scan direction but are at the same position in the main scan direction are shifted by the same shift amount.

When difference between images on the both sides which are formed by the image-forming unit 19 and a characteristic of deformation are measured, the image-forming unit 19 forms a detection pattern stored in the storage unit 15 on a sheet. The image-reading unit 17 reads the sheet, and image data of the detection pattern is generated from a read signal. Then the image-deformation processing unit 20 analyzes the image data of the detection pattern and calculates magnification ratios of both sides and a correction value for correcting deformation in the main scan direction and the sub scan direction respectively. For example, as correction values for correcting deformation in the sub scan direction, shift amounts in the sub scan direction at main scan positions are calculated. Therefore positions where steps may be caused are determined.

Next, slight-magnification pixel-dispersion processing will be explained. The slight-magnification pixel-dispersion processing is a slight magnification processing which includes pixel-dispersion processing. The pixel-dispersion processing in the slight magnification processing is processing wherein positions to or from which pixels are inserted or deleted vary with lines along the direction where the image is enlarged or reduced.

Figure 3A:
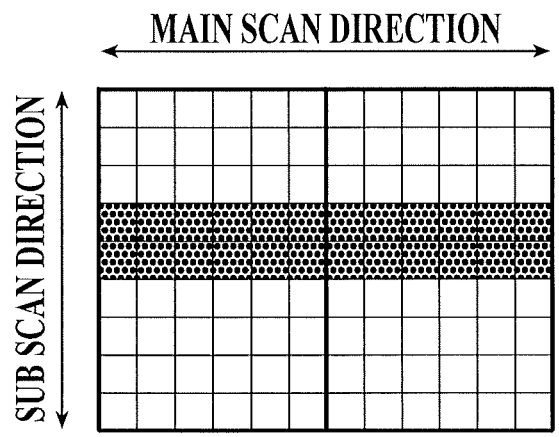
FIG. 3A shows an example of an original image for slight-magnification pixel-dispersion processing.

FIG. 3A is an example of an original image having twelve pixels in the main scan direction and nine pixels in the sub scan direction. This original image includes a narrow line of black pixels along the main scan direction which has a width of two pixels in the sub scan direction.

Figure 3B:
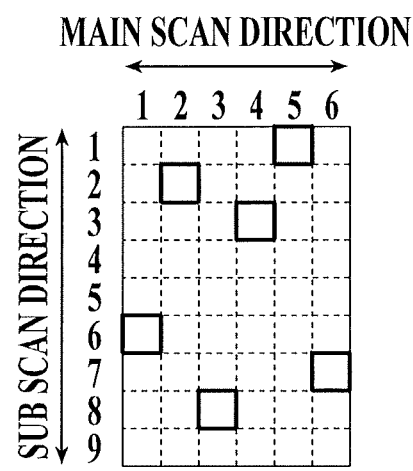
FIG. 3B shows an example of a pixel-dispersion table.

FIG. 3B shows an example of a pixel-dispersion table. The pixel-dispersion table shows which position in the sub scan direction a pixel is inserted or deleted for each pixel position in the main scan direction. The pixel-dispersion table consists of numerals, for example, as follows:

(PIXEL-DISPERSION TABLE)={6, 2, 8, 3, 1, 7}

The order of numerals corresponds to pixel positions in the main scan direction, and each numeral in the table indicates a pixel-operation position in the sub scan direction. The pixel-operation position is a position to which a pixel is inserted in enlargement and is also a position from which a pixel is deleted in reduction.

According to the pixel-dispersion table, for example, on the line along the sub scan direction (a pixel line in the longitudinal direction) including the first pixel in the main scan direction, pixel-operation is executed on the sixth pixel in the sub scan direction. On the line including the second pixel in the main scan direction, pixel-operation is executed on the second pixel in the sub scan direction.

The pixel-dispersion table consists of six numerals. When the table is used for a larger image, the pixel-dispersion tables are connected successively. The size of the original image in FIG. 3A in the main scan direction is twice as long as the size of the pixel-dispersion table in FIG. 3B. Therefore two pixel-dispersion tables are connected in the main scan direction.

Figure 4:
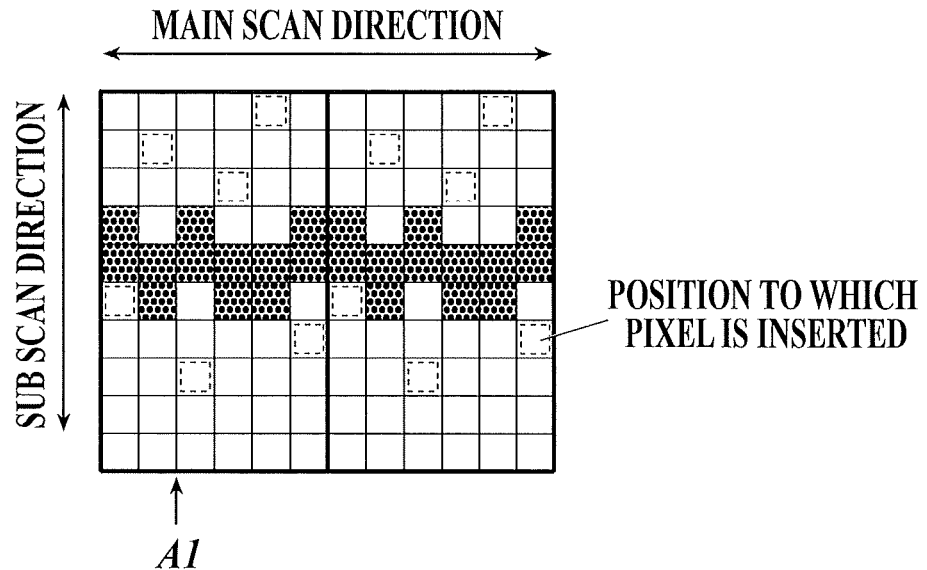
FIG. 4 shows an example of an enlarged image after pixels are inserted in accordance with the pixel-dispersion table.

When the original image in FIG. 3A is modified into an image having twelve pixels in the main scan direction and ten pixels in the sub scan direction, that is to say, enlarged by one pixel in the sub scan direction, one pixel is inserted to each line along the sub scan direction at a certain position. Each position where a pixel is inserted is determined in accordance with the pixel-dispersion table. FIG. 4 shows an enlarged image after pixels are inserted in accordance with the pixel-dispersion table.

When the original image in FIG. 3A is modified into an image having twelve pixels in the main scan direction and eight pixels in the sub scan direction, that is to say, reduced by one pixel in the sub scan direction, one pixel is deleted from each line along the sub scan direction at a certain position. Each position from which a pixel is deleted is determined in accordance with the pixel-dispersion table. FIG. 4 shows a reduced image after pixels are deleted in accordance with the pixel-dispersion table.

Figure 5:
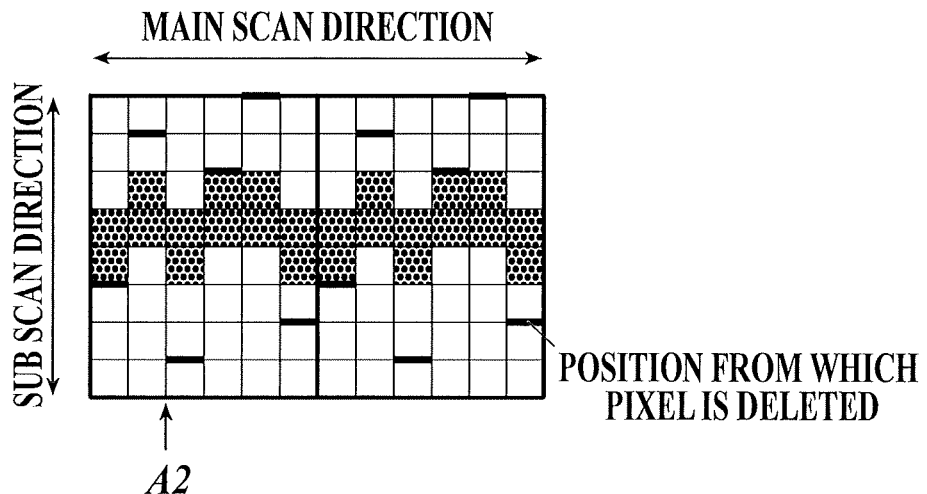
FIG. 5 shows an example of a reduced image after pixels are deleted in accordance with the pixel-dispersion table.

Thus positions to or from which pixels are inserted or deleted vary with lines along the sub scan direction. Therefore bad influence, such as moire caused in a repeated pattern in the nearest neighbor processing, is reduced. On the other hand, when there are edges (boundaries between black pixels and white pixels) along the main scan direction as shown in FIG. 3A, roughness in accordance with a pattern of the pixel-dispersion table is caused in the enlarged or reduced image. As shown in FIG. 4 and FIG. 5, patterns of the roughness in an enlarged image and a reduced image are opposite to each other. Specifically, a direction of a step caused at an edge of a certain position is determined depending on which is larger between adjacent numerals in the pixel-dispersion table and on whether the image is enlarged or reduced.

For example, at the position shown with an arrow A1 in FIG. 4, the original image includes an edge in the main scan direction between the second pixel (the second numeral in the pixel-dispersion table) and the eighth pixel (the third numeral in the pixel-dispersion table) in the sub scan direction. Therefore a step rising toward right is caused when the image is enlarged. If the original image does not include an edge along the main scan direction between the second pixel and the eighth pixel along the sub scan direction, a step is not caused at the position shown with the arrow A1.

In the example of enlargement in FIG. 4, a step rising toward right can be caused when the right numeral of two adjacent numerals in the pixel-dispersion table is larger than the left numeral. A step declining toward right can be caused when the right numeral of two adjacent numerals in the pixel-dispersion table is smaller than the left numeral.

At the position shown with an arrow A2 in FIG. 5, the original image includes an edge in the main scan direction between the second pixel (the second numeral in the pixel-dispersion table) and the eighth pixel (the third numeral in the pixel-dispersion table) in the sub scan direction. Therefore a step declining toward right is caused when the image is reduced. If the original image does not include an edge along the main scan direction between the second pixel and the eighth pixel along the sub scan direction, a step is not caused at the position shown with the arrow A2.

In the example of enlargement in FIG. 5, a step declining toward right can be caused when the right numeral of two adjacent numerals in the pixel-dispersion table is larger than the left numeral. A step rising toward right can be caused when the right numeral of two adjacent numerals in the pixel-dispersion table is smaller than the left numeral.

Figure 6:
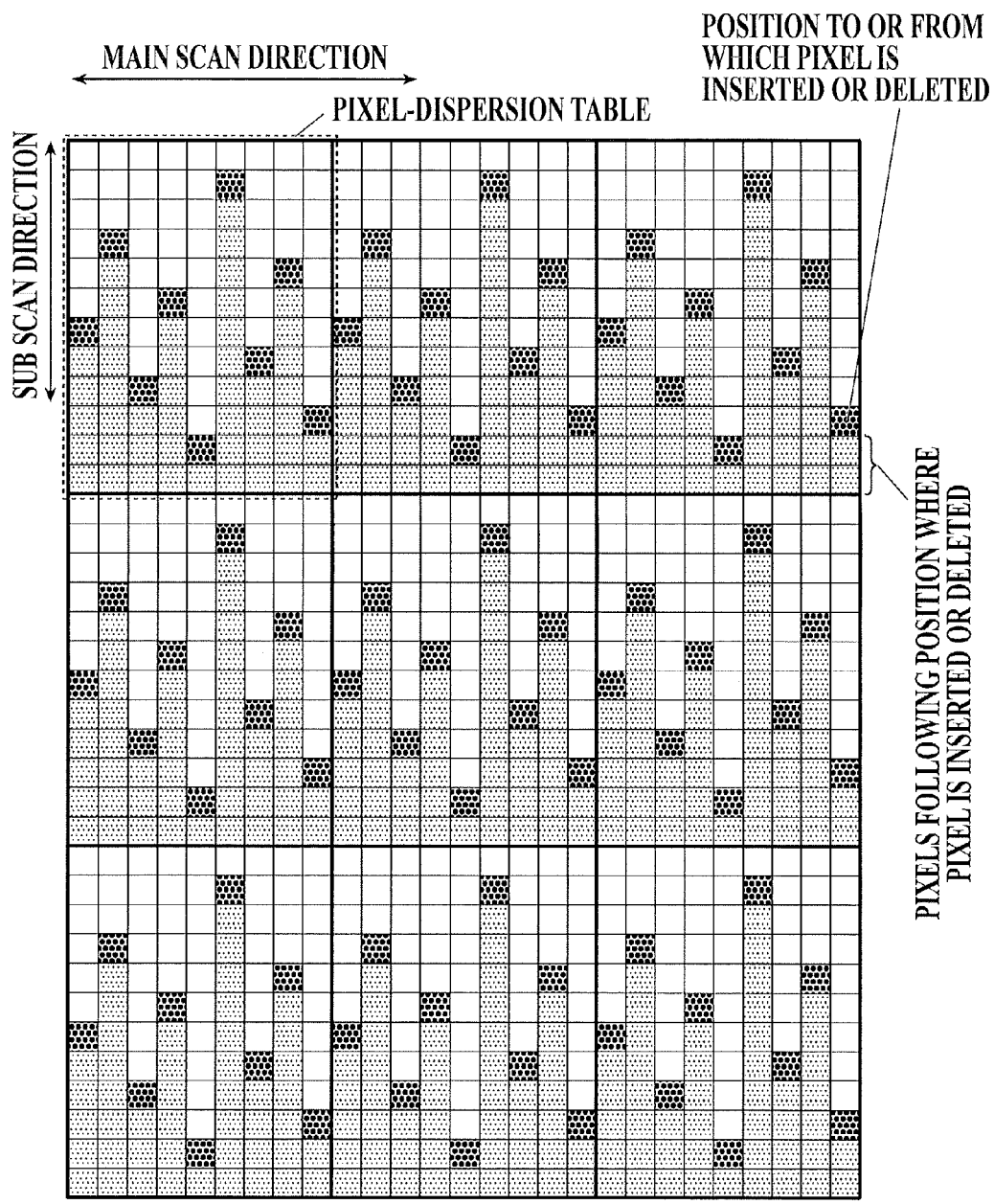
FIG. 6 shows an example of pixel-dispersion tables arranged in series in a main scan direction and also in the sub scan direction.

FIG. 6 shows an example wherein pixel-dispersion tables different from the above pixel-dispersion table are arranged in series in the main scan direction and in the sub scan direction (3×3). Only one pixel can be inserted or deleted using each pixel-dispersion table. Therefore, in order to insert three pixels in the sub scan direction, three pixel-dispersion tables are connected in the sub scan direction. As pixels are inserted or deleted at the positions indicated by the pixel-dispersion table, positions of pixels following the inserted or deleted pixels change.

The pixel-dispersion table is prepared for each magnification ratio in advance and is stored in the storage unit 15. However, the pixel-dispersion table may be generated every time enlargement or reduction is executed. For example, when the pixel-dispersion table for a basic magnification ratio is to be modified for another magnification ratio, each numeral in the original pixel-dispersion table is multiplied by the reciprocal of a ratio of "a ratio of inserting or deleting pixels in the image in another magnification ratio" to "a ratio of inserting or deleting pixels when the basic magnification ratio is used" and is rounded off to an integer. Specifically, when a ratio of inserting or deleting pixels in the pixel-dispersion table in FIG. 3B is desired to be ½, the pixel-dispersion table of {12, 4, 16, 6, 2, 14} is generated for a block having six pixels in the main scan direction and eighteen pixels in the sub scan direction. When a ratio of inserting pixels in enlargement and a ratio of deleting pixels in reduction are the same, the pixel-dispersion table can be used in common.

Next, the deformation-correction processing will be explained.

Figure 7C:
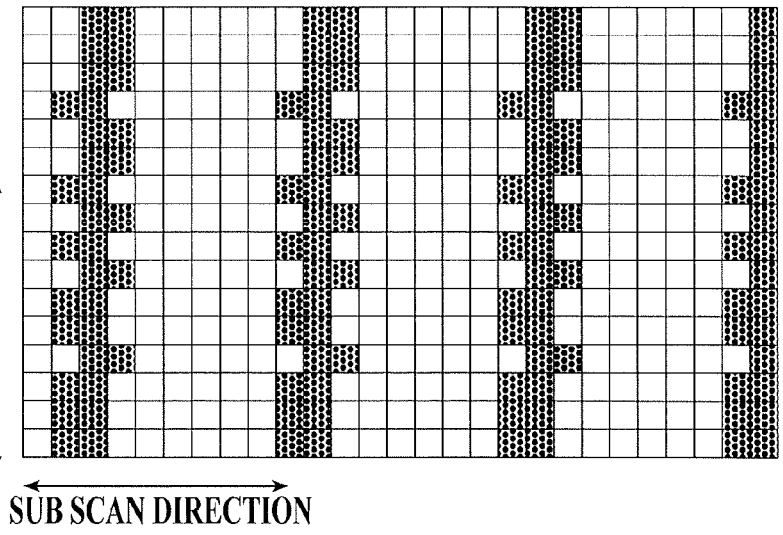
FIG. 7C shows an example wherein pixel-dispersion processing is executed together with the deformation-correction processing.
Figure 7B:
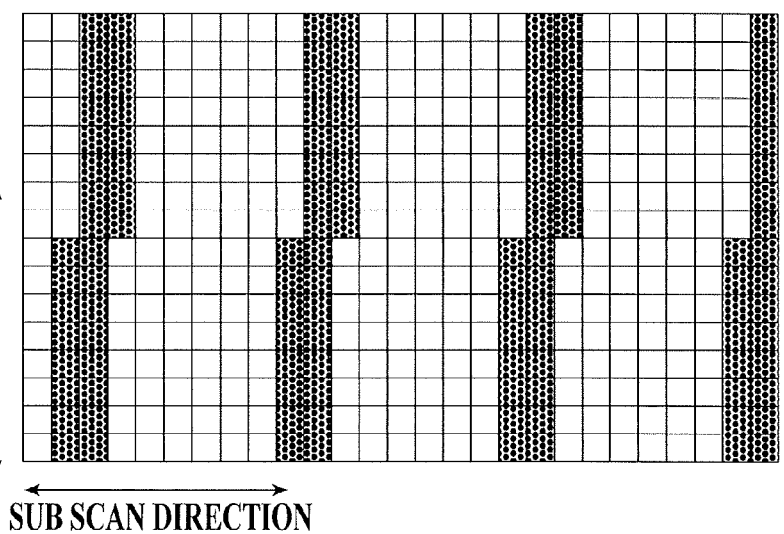
FIG. 7B shows an example wherein pixels in the original image are simply shifted.
Figure 7A:
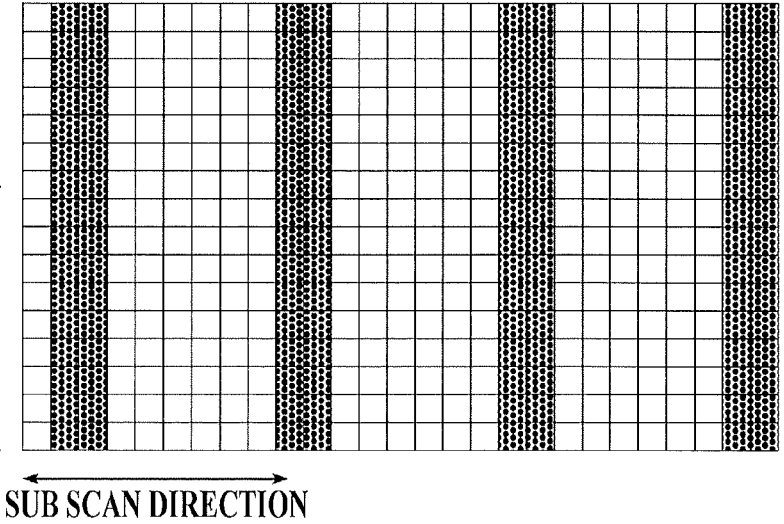
FIG. 7A shows an example of an original image for deformation-correction processing.

FIG. 7A is an example of an original image including a narrow line along the main scan direction having a width of two pixels in the sub scan direction.

FIG. 7B is an example wherein pixels are simply shifted along one shift-border for making a one-pixel step in the original image (hereinafter referred to as simple deformation-correction processing).

In the simple deformation-correction processing, when a step at each position of the shift-border is conspicuous as shown in FIG. 7B, the deformation-correction processing is accompanied with pixel-dispersion processing as shown in FIG. 7C (hereinafter referred to as deformation-correction and pixel-dispersion processing). The pixel-dispersion processing in the deformation-correction processing is processing of dispersing positions of steps in the image caused by shift of pixels. In this example, from left to right, black pixels having a two-pixel width in the sub scan direction are raised and lowered alternately and are lowered by one pixel at the end. Thereby positions of black pixels and white pixels are dispersed so that roughness at edges in the image is smoothed.

Next, operation of the image processing device 10 according to the first embodiment will be explained.

Figure 8:
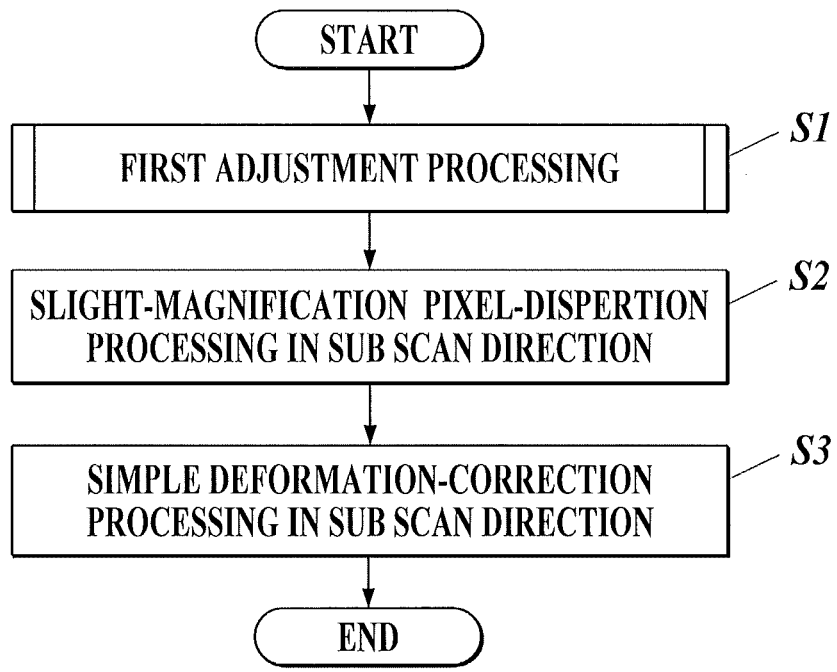
FIG. 8 is a flowchart of image-modification processing according to the first embodiment.

FIG. 8 is a flowchart of image-modification processing according to the first embodiment. In this processing, the slight-magnification pixel-dispersion processing in the sub scan direction is executed as the first image-modification processing, and the simple deformation-correction processing in the sub scan direction is executed as the second image-modification processing. A magnification ratio in the slight magnification processing in the sub scan direction and a correction value for correcting deformation in the simple deformation-correction processing in the sub scan direction are calculated in advance and are stored in the storage unit 15.

First, the adjustment unit 21 executes the first adjustment processing of adjusting the position of the shift-border in the simple deformation-correction processing in the sub scan direction on the basis of positions of steps in the image which can be caused in the slight-magnification pixel-dispersion processing in the sub scan direction (Step S1).

Figure 9:
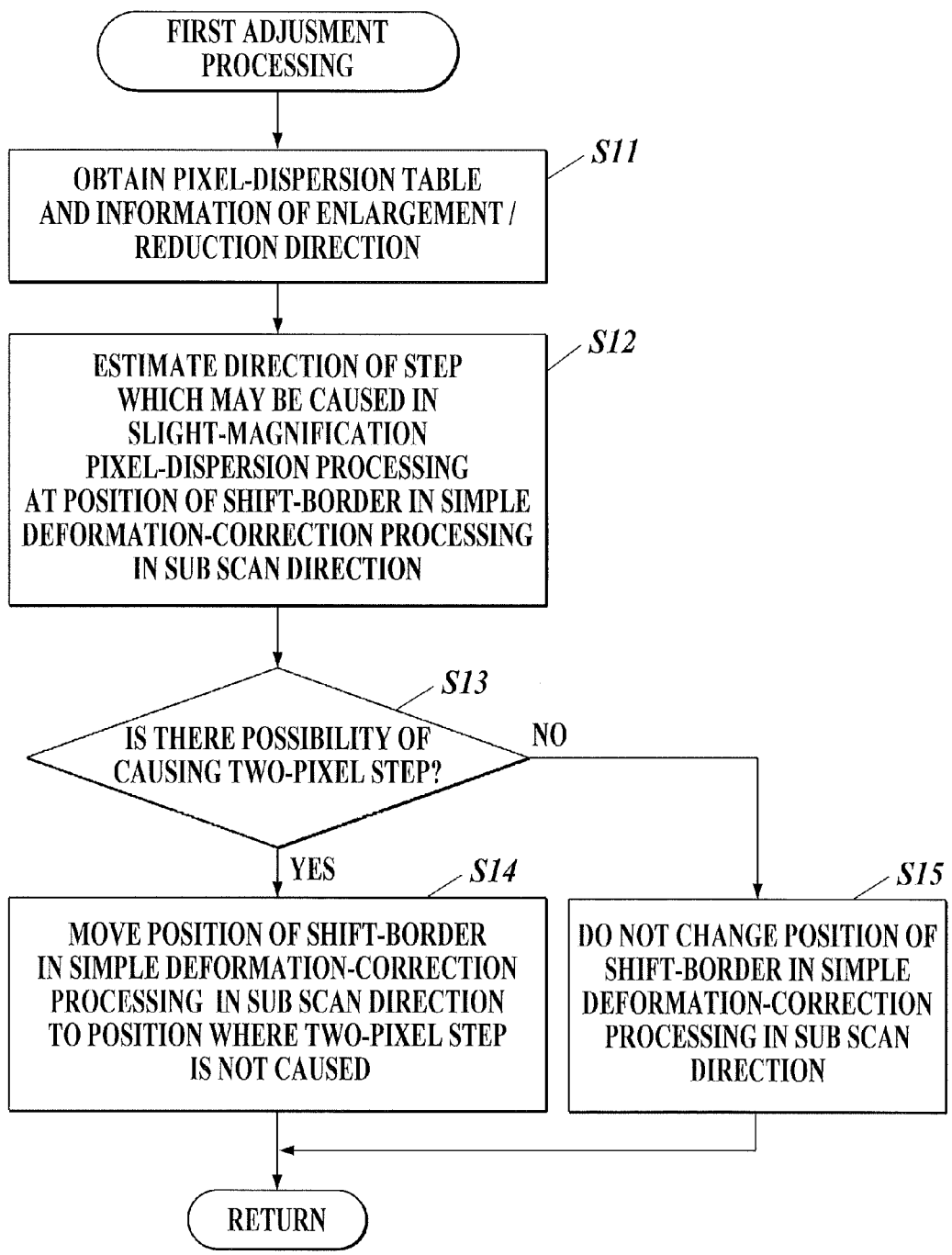
FIG. 9 is a flowchart of the first adjustment processing.

The first adjustment processing will be explained referring to FIG. 9.

The adjustment unit 21 obtains, on the basis of a magnification ratio of slight magnification processing in the sub scan direction, the pixel-dispersion table corresponding to the magnification ratio from the storage unit 15. Also, the adjustment unit 21 obtains information showing whether the processing is enlargement or reduction on the basis of the magnification ratio in the slight magnification processing in the sub scan direction (Step S11).

Next, the adjustment unit 21 determines a position of the shift-border and a direction in which pixels are shifted in the simple deformation-correction processing in the sub scan direction on the basis of the correction value for correcting deformation in the simple deformation-correction processing in the sub scan direction stored in the storage unit 15. Then the adjustment unit 21 estimates a direction of a step which can be caused in the slight-magnification pixel-dispersion processing at a position of the shift-border on the basis of the pixel-dispersion table and the information showing whether the processing is enlargement or reduction (Step S12).

In the enlargement processing, a step rising toward right can be caused when the right numeral of two numerals in the pixel-dispersion table which corresponds to pixel positions on the both sides of the shift-border in the simple deformation-correction processing in the sub scan direction is larger than the left numeral. A step declining toward right can be caused when the right numeral of the two numerals is smaller than the left numeral.

In the reduction processing, a step declining toward right can be caused when the right numeral of two numerals in the pixel-dispersion table which corresponds to pixel positions on the both sides of the shift-border in the simple deformation-correction processing in the sub scan direction is larger than the left numeral. A step rising toward right can be caused when the right numeral of the two numerals is smaller than the left numeral.

Next, the adjustment unit 21 determines whether a two-pixel step can be caused at the position of the shift-border in the simple deformation-correction processing in the sub scan direction (Step S13). Specifically, the adjustment unit 21 compares a direction of a step which can be caused in the slight-magnification pixel-dispersion processing in the sub scan direction with a direction of a step which can be caused in the simple deformation-correction processing in the sub scan direction. When the directions of the steps are the same, the adjustment unit 21 determines that a two-pixel step can be caused.

When determining that a two-pixel step can be caused at the position of the shift-border in the simple deformation-correction processing in the sub scan direction (Step S13: YES), the adjustment unit 21 moves the position of the shift-border in the simple deformation-correction processing in the sub scan direction to a position where a two-pixel step is not caused (Step S14).

When determining that a two-pixel step cannot be caused at the position of the shift-border in the simple deformation-correction processing in the sub scan direction at Step S13 (Step S13: NO), the adjustment unit 21 does not change the position of the shift-border in the simple deformation-correction processing in the sub scan direction (Step S15).

After Step S14 and Step S15, the image-modification processing unit 20 executes the slight-magnification pixel-dispersion processing in the sub scan direction as the first image-modification processing on the subject image (Step S2) as shown in FIG. 8. Specifically, the image-modification processing unit 20 executes enlargement processing or reduction processing which are accompanied by the pixel-dispersion processing in the sub scan direction using the pixel-dispersion table for the magnification ratio.

Next, the image-modification processing unit 20 executes the simple deformation-correction processing in the sub scan direction as the second image-modification processing on the subject image on the basis of the position of the shift-border adjusted in the first adjustment processing (Step S3).

Then the image-deformation processing according to the first embodiment ends.

Figure 10A:
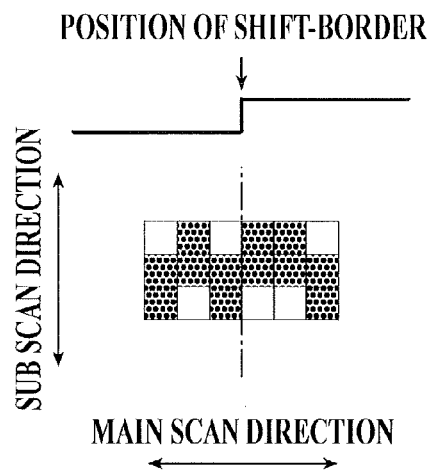
FIG. 10A shows an example of an image after the slight-magnification pixel-dispersion processing.
Figure 10B:
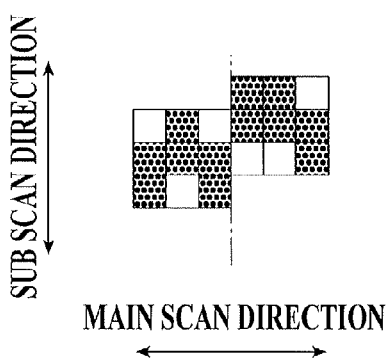
FIG. 10B shows an example wherein a level difference of a step caused in pixel-shift processing is widened to two pixels in the slight-magnification pixel-dispersion processing.

An example case where pixel-shift processing in simple deformation-correction processing is executed on roughness caused in the slight-magnification pixel-dispersion processing will be explained. When pixel-shift processing wherein a step rising toward right is caused at a position of the shift-border is executed on an image after the slight-magnification pixel-dispersion processing shown in FIG. 10A, a step caused in the pixel-shift processing is added to the step caused in the slight-magnification pixel-dispersion processing so that a two-pixel step is caused as shown in FIG. 10B.

Figure 11A:
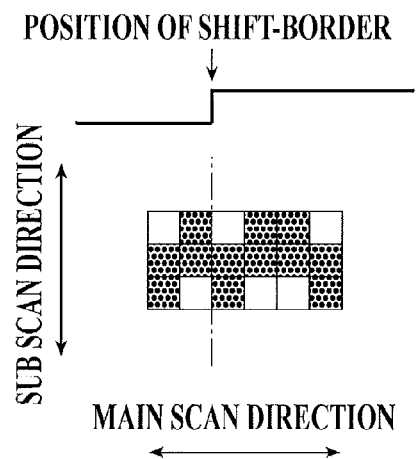
FIG. 11A shows an example wherein a position of a shift-border along which the pixels are shifted is moved in an image after the slight-magnification pixel-dispersion processing.
Figure 11B:
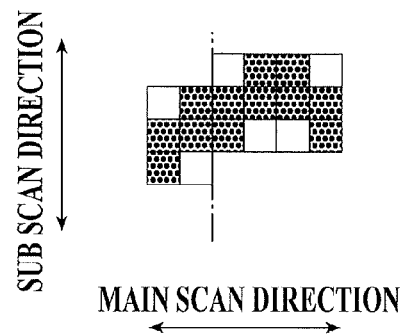
FIG. 11B shows an example where a level difference of a step caused in pixel-shift processing is prevented from being widened in the slight-magnification pixel-dispersion processing.

Therefore, for example, the position of the shift-border in the simple deformation-correction processing is moved to a position shown in FIG. 11A. Thereby, as shown in FIG. 11B, the step caused in the pixel-shift processing (step rising toward right) and the step caused in the slight-magnification pixel-dispersion processing (step declining toward right) offset each other so that the steps are prevented from being added up.

It is not necessary to compare positions where steps are actually caused in the image after the first image-modification processing with positions where steps are actually caused in the second image-modification processing. Positions and directions of steps caused in the first image-modification processing is known on the basis of the pixel-dispersion table and the information showing whether the processing is enlargement or reduction. Positions of steps which can be caused in the second image-modification processing is changed such that a position and a direction of each step caused in the first image-modification processing do not coincide with a position and a direction of a step caused in the second image-modification processing. That is to say, a position of the shift-border in the second image-modification processing is moved to a position where a step caused in the first image-modification processing can be eliminated.

As described above, according to the first embodiment, a position of the shift-border in the second image-modification processing is adjusted such that a level difference of a step at the position of the shift-border in an image which is caused in the first image-modification processing is not widened in the second image-modification processing. Therefore deterioration of picture quality is prevented when several kinds of image-modification processing are executed on an image.

In FIG. 8, a case where the slight-magnification pixel-dispersion processing in the sub scan direction is executed as the first image-modification processing and where the simple deformation-correction processing in the sub scan direction is executed as the second image-modification processing is explained. However, it is also possible that the slight-magnification pixel-dispersion processing in the main scan direction is executed as the first image-modification processing and that the simple deformation-correction processing in the main scan direction is executed as the second image-modification processing.

Second Embodiment

Next, the second embodiment according to the present invention will be explained.

The configuration of the image processing device according to the second embodiment is the same as the image processing device 10 according to the first embodiment. Therefore, by referring to FIG. 1, figures and explanations are omitted. Hereinafter, configuration and processing characteristic of the second embodiment will be explained.

The image-modification processing unit 20 executes the first image-modification processing wherein pixels are inserted or deleted in the first direction to or from a subject image and the second image-modification processing wherein pixels in the subject image are shifted in the second direction.

The adjustment unit 21 adjusts a position of the shift-border along which the pixels are shifted in the second image modification processing on the basis of positions of steps caused in the first image-modification processing.

In the second embodiment, in the same manner as the first embodiment, the second direction is the same as the first direction.

The adjustment unit 21 adjusts the position of the shift-border in the second image modification processing such that a level difference of a step at the position of the shift-border in an image which is caused in the first image-modification processing is not widened in the second image-modification processing.

A value indicating a relative position in the subject image corresponding to a position along the first direction on an output image output by executing the first image-modification processing and/or the second image-modification processing on the subject image is referred to as a relative reference value.

The storage unit 15 stores a reference table (pixel-dispersion reference table which will be explained later) wherein each pixel position in a direction perpendicular to the first direction is related to reference-pixel information indicating which pixel in the subject image is referred to for a pixel value of the output image for each relative reference value.

The image-deformation processing unit 20 adds, for each pixel, the relative reference value based on the first image-modification processing to the relative reference value based on the second image-modification processing, obtain the reference-pixel information related to the pixel position in the direction perpendicular to the first direction and to an added value of the relative reference values from the reference table stored in the storage unit 15, and executes the first image-modification processing and the second image-modification processing at the same time on the basis of the obtained reference-pixel information.

The first image-modification processing includes processing wherein positions to or from which pixels are inserted or deleted are made to vary with lines along the first direction.

The second image-modification processing includes processing wherein deformation is corrected in the second direction.

Figure 12:
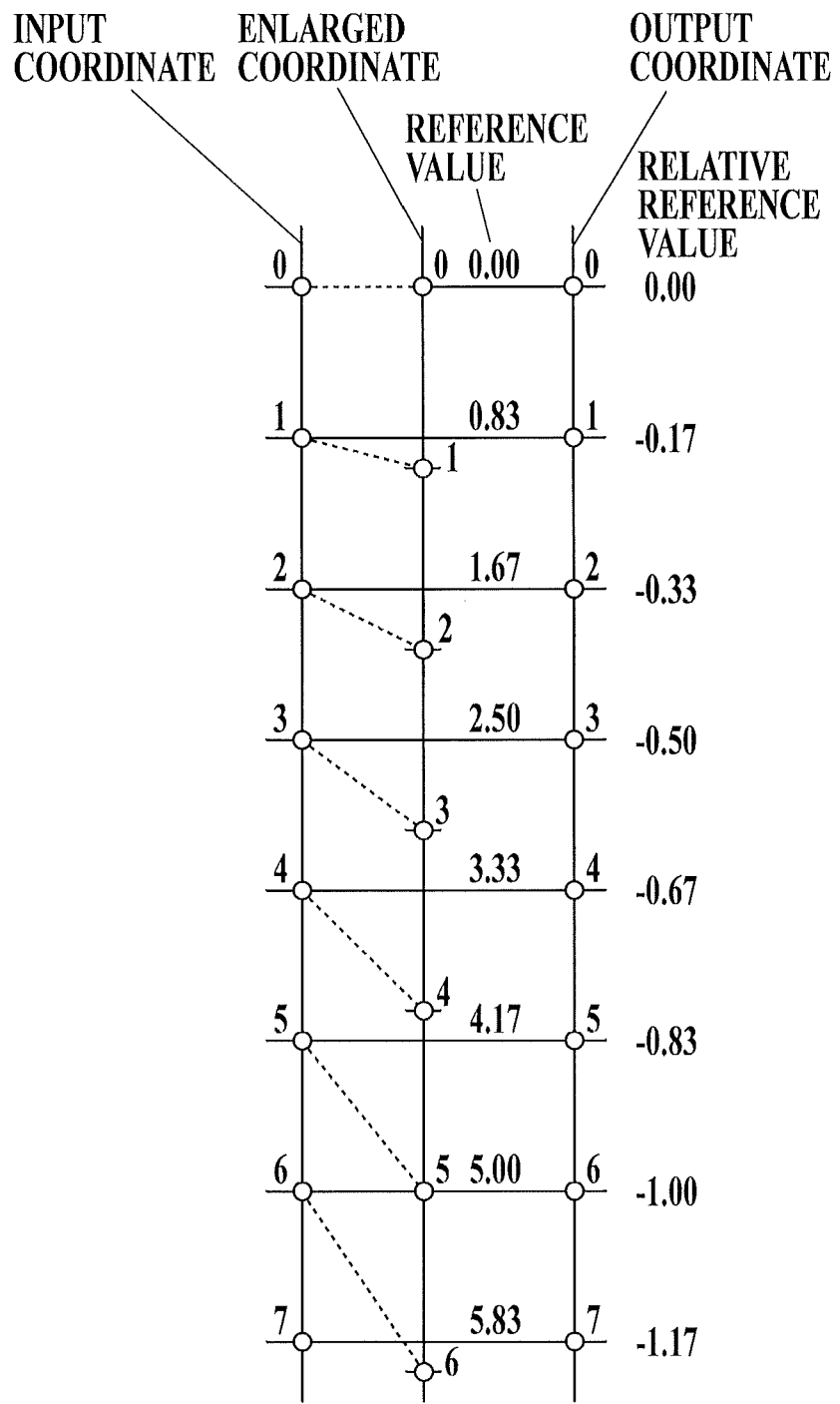
FIG. 12 illustrates relative reference values in enlargement processing in a one-dimensional direction.

Next, a relative reference value in the enlargement processing (enlargement ratio: 1.2 times) in a one-dimensional direction will be explained referring to FIG. 12.

When an image is enlarged, a coordinate system is enlarged (enlarged coordinate system) in comparison with an input coordinate system. Each position shown with "○" in the input coordinate system indicates the center position of a pixel in an original image. The enlarged coordinate system shows enlargement processing by moving of each "○" position.

An output coordinate system has the same scale and the same phase as the input coordinate system. Since each pixel size does not change in the actual image processing, a pixel value at each "○" position in the output coordinate system must be determined referring to the input coordinate system.

Hereinafter, an enlarged-coordinate value corresponding to an output-coordinate value is referred to as a reference value. That is to say, a reference value indicates which coordinate value in the enlarged coordinate system the position of each pixel in the output coordinate system corresponds to, and is an input coordinate after image-modification processing which is related to an output coordinate. After a reference value corresponding to an output coordinate is calculated, which input-pixel value should be referred to for each output coordinate is known. At this time, reference numerals with decimals are generated at some enlargement ratios. In a usual image processing, output-pixel values are calculated by executing interpolation processing using pixel values around the reference value.

A relative reference value is a relative value in relation to the output coordinate of a reference value, which is expressed by the following equation.

(RELATIVE REFERENCE VALUE)=(REFERENCE VALUE)−(OUTPUT COORDINATE)

That is to say, a relative reference value shows a relative position in an input image in relation to a position in an output image on the basis of the output coordinate.

For example, in order to find a pixel value of the output coordinate 5, a pixel value of the input coordinate (4.17), which is 0.83 pixels back from 5, is referred to.

When an image is reduced, relative reference values are positive, and the input coordinate which is ahead of an output coordinate by a relative reference value is referred to.

Figure 13:
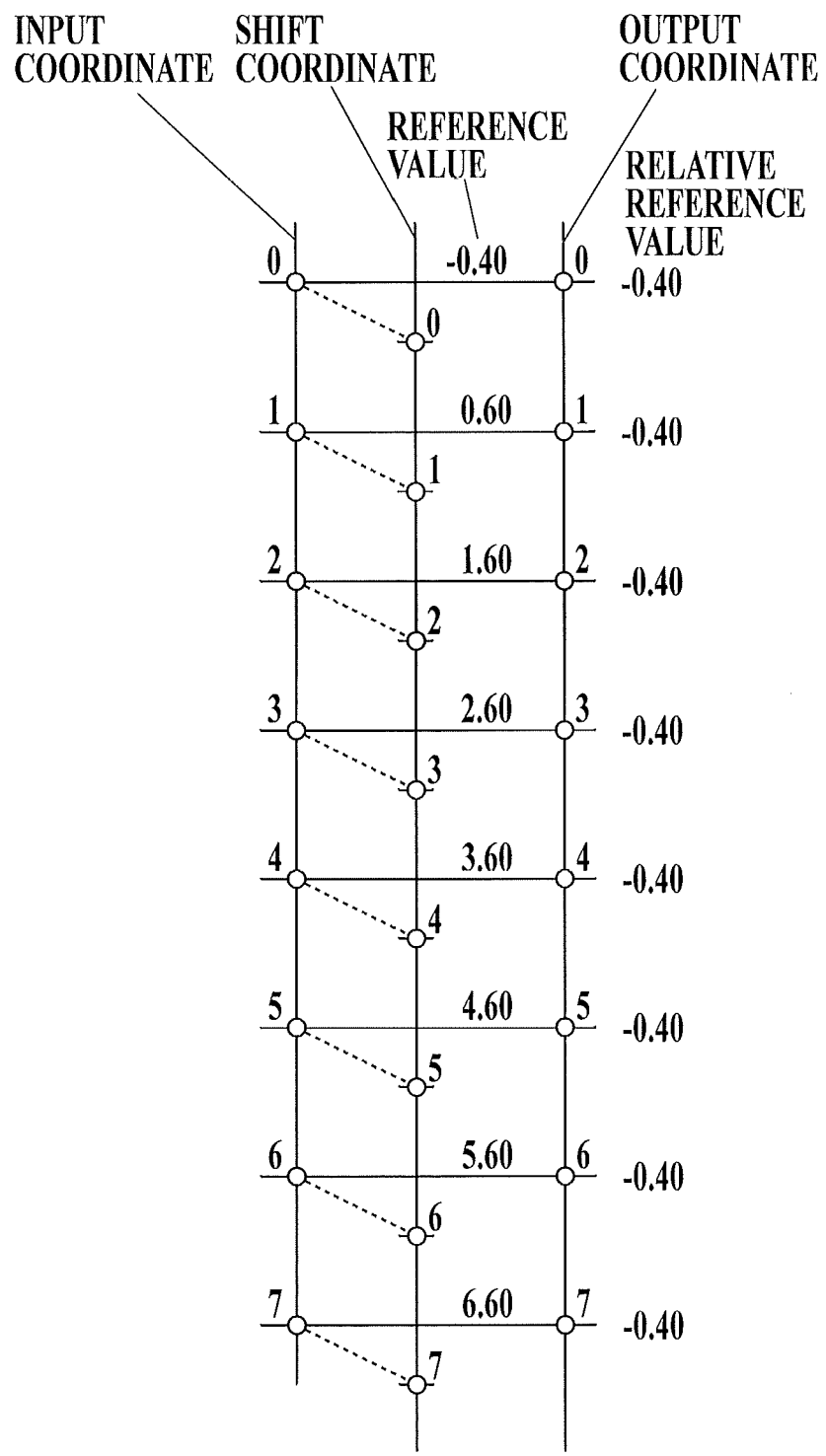
FIG. 13 illustrates relative reference values in shift processing in a one-dimensional direction.

Next, a relative reference value in shift processing (0.4 pixel shift) in a one-dimensional direction will be explained referring to FIG. 13.

When an image is shifted, the coordinate system is not enlarged in relation to the input coordinate, but a phase is changed (shift coordinate system). In the same manner as the enlargement processing, a shift coordinate value corresponding to an output coordinate value is used as a reference value, and a relative value of a reference value in relation to the output coordinate is used as a relative reference value. When deformation-correction processing is executed in the sub scan direction, relative reference values are the same at all the positions in the sub scan direction (−0.40 in the example of FIG. 13).

Relative reference values make it possible to use relative reference values based on the slight magnification processing and relative reference values based on the deformation-correction processing in the same scale.

Figure 14:
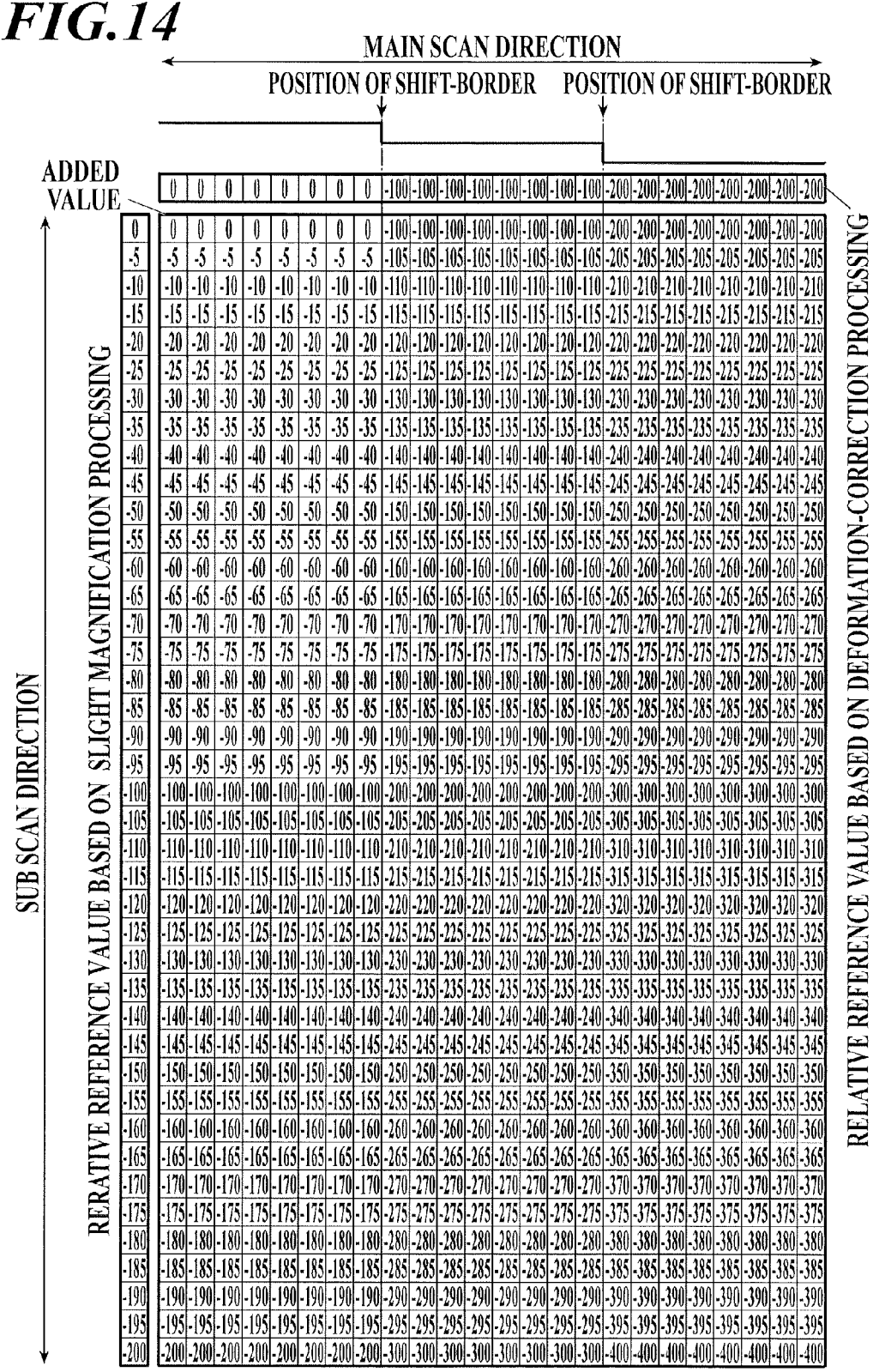
FIG. 14 shows an example of relative reference values corresponding to pixels in an output image.

FIG. 14 shows an example of relative reference values (%) corresponding to pixels in an output image in a case where the slight magnification processing and the deformation-correction processing is executed in the sub scan direction. This slight magnification processing is enlargement processing wherein one pixel is inserted for every twenty pixels in the sub scan direction. Also, this deformation-correction processing is processing where pixel-shift of making a step declining toward right in the sub scan direction is executed for every eight pixels in the main scan direction. A relative reference value corresponding to each pixel in the output image is a value obtained by adding a relative reference value based on the slight magnification processing to a relative reference value based on the deformation-correction processing.

A relative reference value in relation to the output coordinate corresponds to a value obtained by turning plus and minus of a moving amount of a pixel in relation to the input coordinate (relative moving amount with a direction of the pixel in the input coordinate taken into account). For example, referring to a pixel which is one pixel above a pixel in an original image for a pixel value in an output image means lowering the pixel in the original image by one pixel.

The image-modification processing unit 20 refers to a pixel-dispersion reference table on the basis of a relative reference value obtained for each pixel in an output image. The pixel-dispersion reference table is stored in the storage unit 15 in advance.

Figure 15:
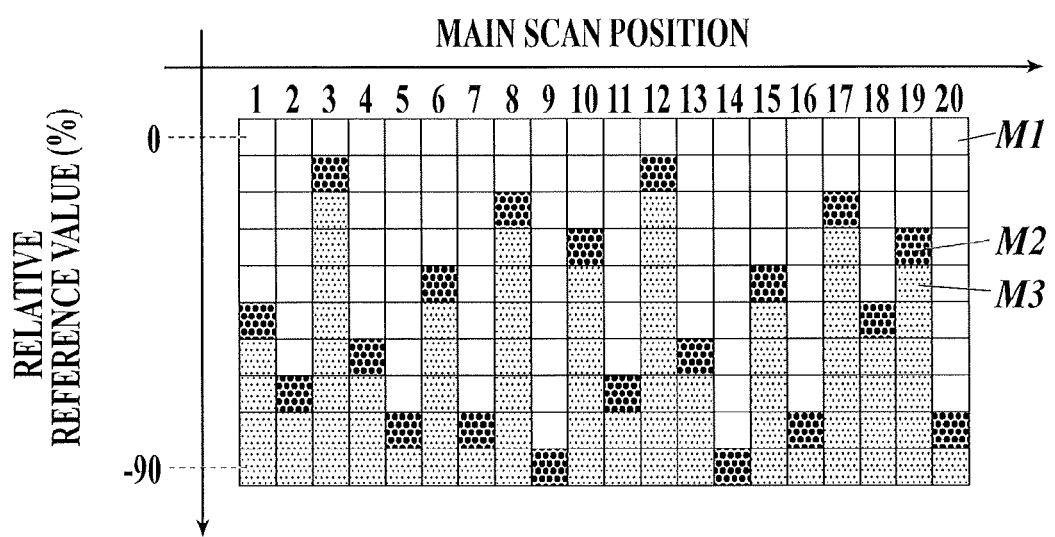
FIG. 15 shows an example of a pixel-dispersion reference table.

FIG. 15 shows an example of the pixel-dispersion reference table. In FIG. 15, the horizontal axis indicates a pixel position in the main scan direction of an image, and the longitudinal axis indicates a relative reference value. Relative reference values are shown in %.

In the pixel-dispersion reference table, each pixel position in the main scan direction is related to reference pixel information which indicates which pixel in the subject image is referred to for a pixel value of an output image for each relative reference value. In FIG. 15, the white box M1 indicates referring to an input-pixel value at the same position as the one in the output coordinate. The black box M2 and the gray box M3 indicate referring to the input-pixel value which is one pixel before. That is to say, the black box M2 indicates a switching position where a pixel which is referred to is switched to an adjoining pixel. The switching positions are made to vary with pixel positions in the main scan direction. Thereby positions to or from which pixels are inserted or deleted in the slight magnification processing vary with lines along the sub scan direction.

For example, when a relative reference value is not more than 0% but more than −50% at the first pixel position in the main scan direction, a pixel value of a pixel in the subject image at the same position as a pixel in an output image is referred to for a pixel value of the output image. When the relative reference value is not more than −50% but more than −150%, a pixel value of a pixel in the subject image which is one pixel before a pixel in the output image is referred to for a pixel value of the output image.

As the actual pixel-dispersion reference table, the following table which indicates positions of black boxes M2 (relative reference values) with numerals in the order of the main scan direction can be used.

(PIXEL-DISPERSION REFERENCE TABLE)={−50, −70, −10, −60, −80, −40, −80, −20, −90, −30, −70, −10, −60, −90, −40, −80, −20, −50, −30, −80}

The pixel-dispersion reference table is not limited to the above table, which shows each switching position where a pixel which is referred to is switched to an adjoining pixel. The pixel-dispersion reference table can be other tables as long as it can be known for each pixel position in the main scan direction that which pixel in the subject image is referred to for a pixel value of an output image for each relative reference value.

The pixel-dispersion reference table in FIG. 15 can deal with a relative reference value of −90% at the lowest. Therefore the pixel-dispersion reference tables are connected successively as shown in FIG. 16.

Figure 16:
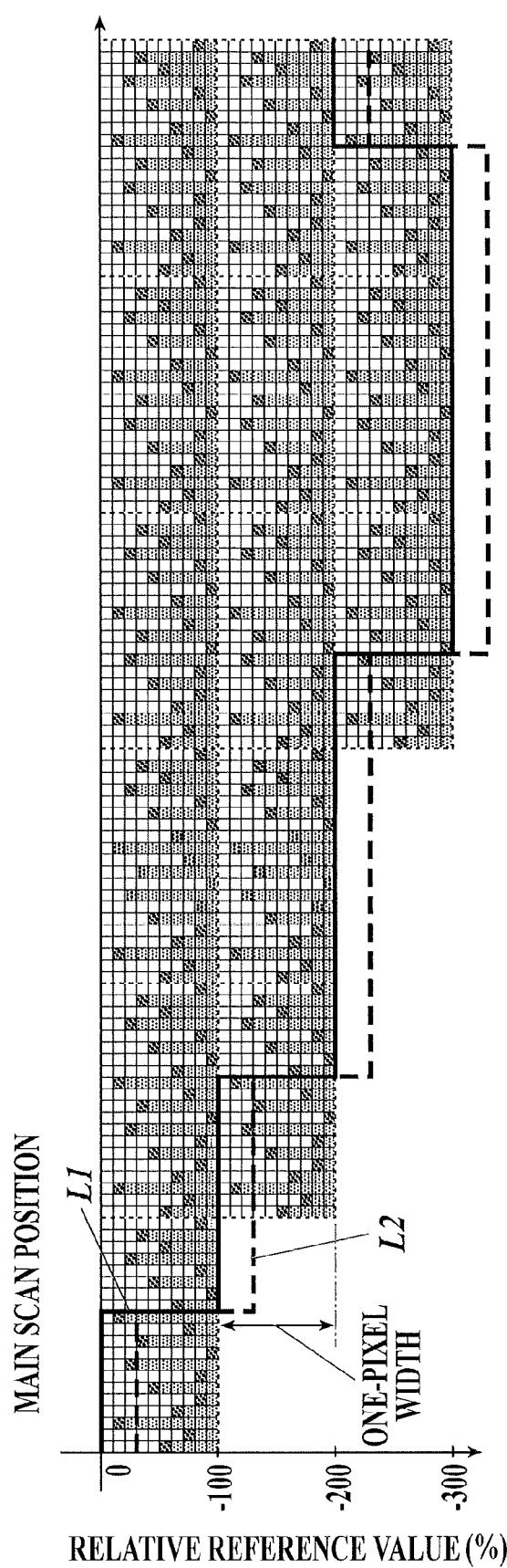
FIG. 16 shows an example of the pixel-dispersion reference tables connected successively.

The table-reference line L1 in FIG. 16 shows reference positions in the pixel-dispersion reference table for a certain line in the main scan position in an output image. The step shape of the table-reference line L1 corresponds to deformation-correction in the sub scan direction. Relative reference values based on the deformation-correction in the sub scan direction are the same as long as the main scan positions thereof are the same. Therefore, the table-reference line L1 is shifted for each line in the main scan direction in the output image (for example, table-reference line L2) when the pixel-dispersion reference table is referred to.

Next, a method for adjusting the table-reference line will be explained.

Figure 17:
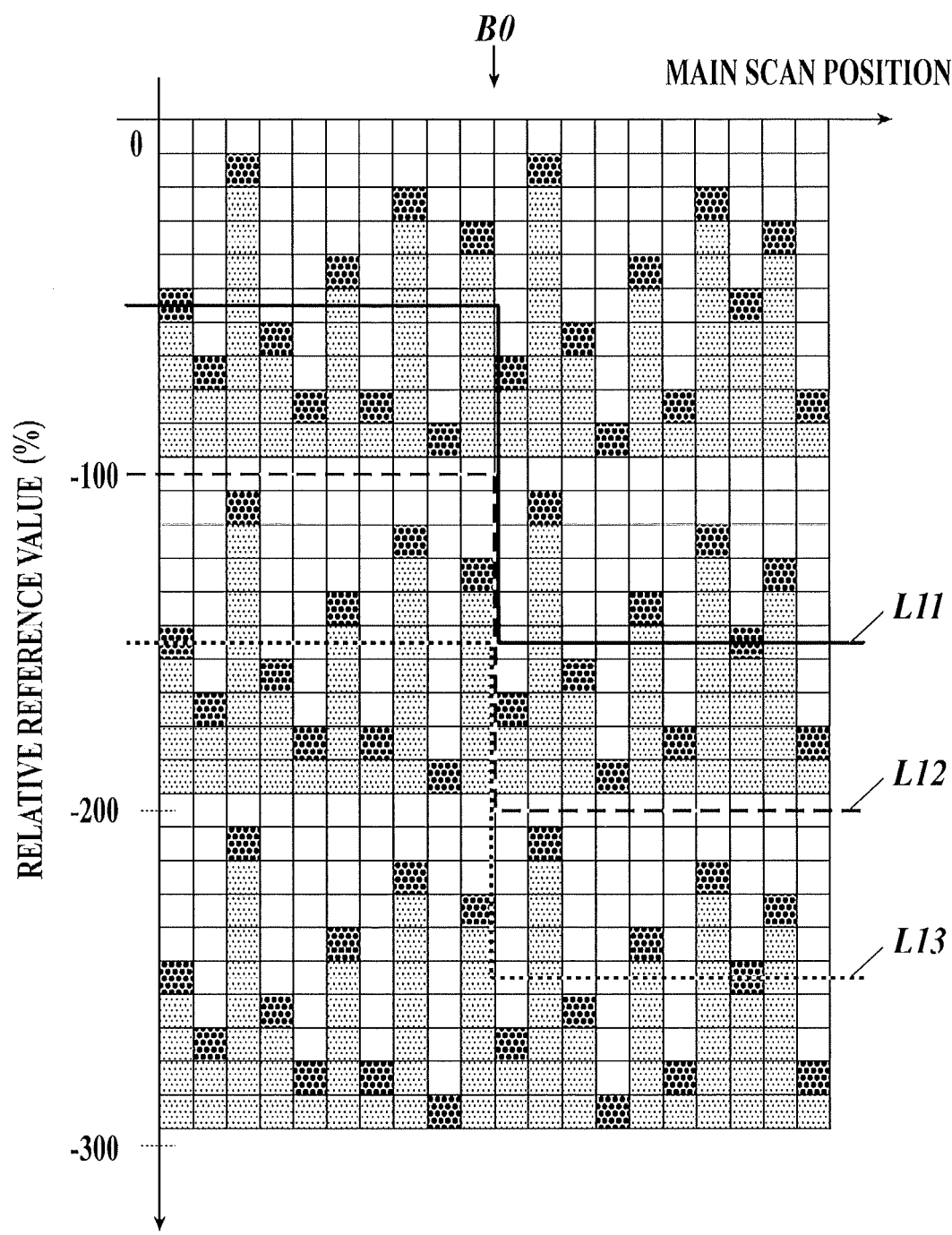
FIG. 17 shows reference positions in the pixel-dispersion reference table for processing a certain line in the main scan direction.

In FIG. 17, three pixel-dispersion reference tables are connected in the longitudinal direction. The table-reference lines L11, L12, L13 show reference positions in the table when a certain line in the main scan direction is processed.

Figure 18A:
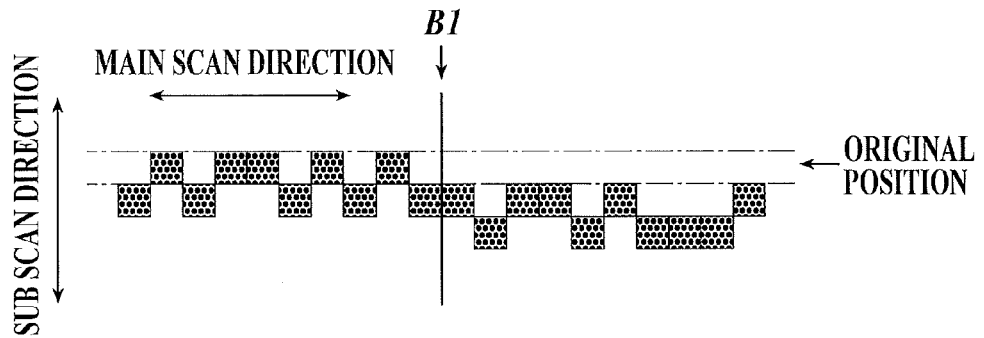
FIG. 18A shows a form obtained by processing a narrow line using a table-reference line L11.
Figure 18B:
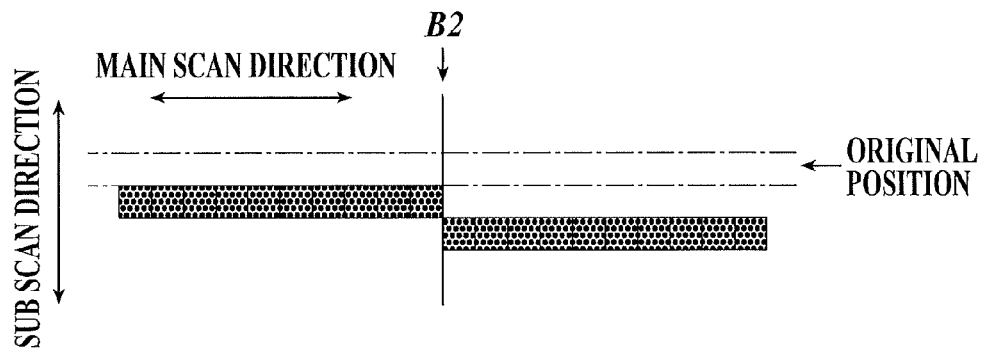
FIG. 18B shows a form obtained by processing the narrow line using a table-reference line L12.
Figure 18C:
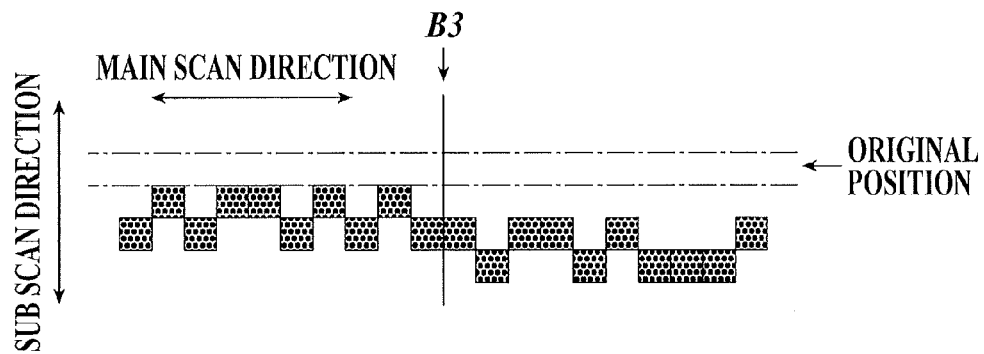
FIG. 18C shows a form obtained by processing the narrow line using a table-reference line L13.

FIG. 18A, FIG. 18B and FIG. 18C show forms obtained by executing processing on a narrow line near an image line using the table-reference lines L11, L12, L13. In each of FIG. 18A, FIG. 18B and FIG. 18C, two chain lines show pixel positions when pixels are not shifted. Also, The positions shown with arrows B1, B2 and B3 in FIG. 18A, FIG. 18B and FIG. 18C correspond to positions (arrow B0) of steps in the table-reference lines L11, L12, L13.

In FIG. 17, as a reference position in the table is shifted from the table-reference line L11 through the table-reference line L12 to the table-reference line L13, a case where the narrow line is made rough by pixel dispersion (FIG. 18A and FIG. 18C) and a case where the narrow line is made to be step-shaped (FIG. 18B) alternate. In these cases, a two-pixel step is not caused at the positions of the arrows B1 to B3.

Figure 19:
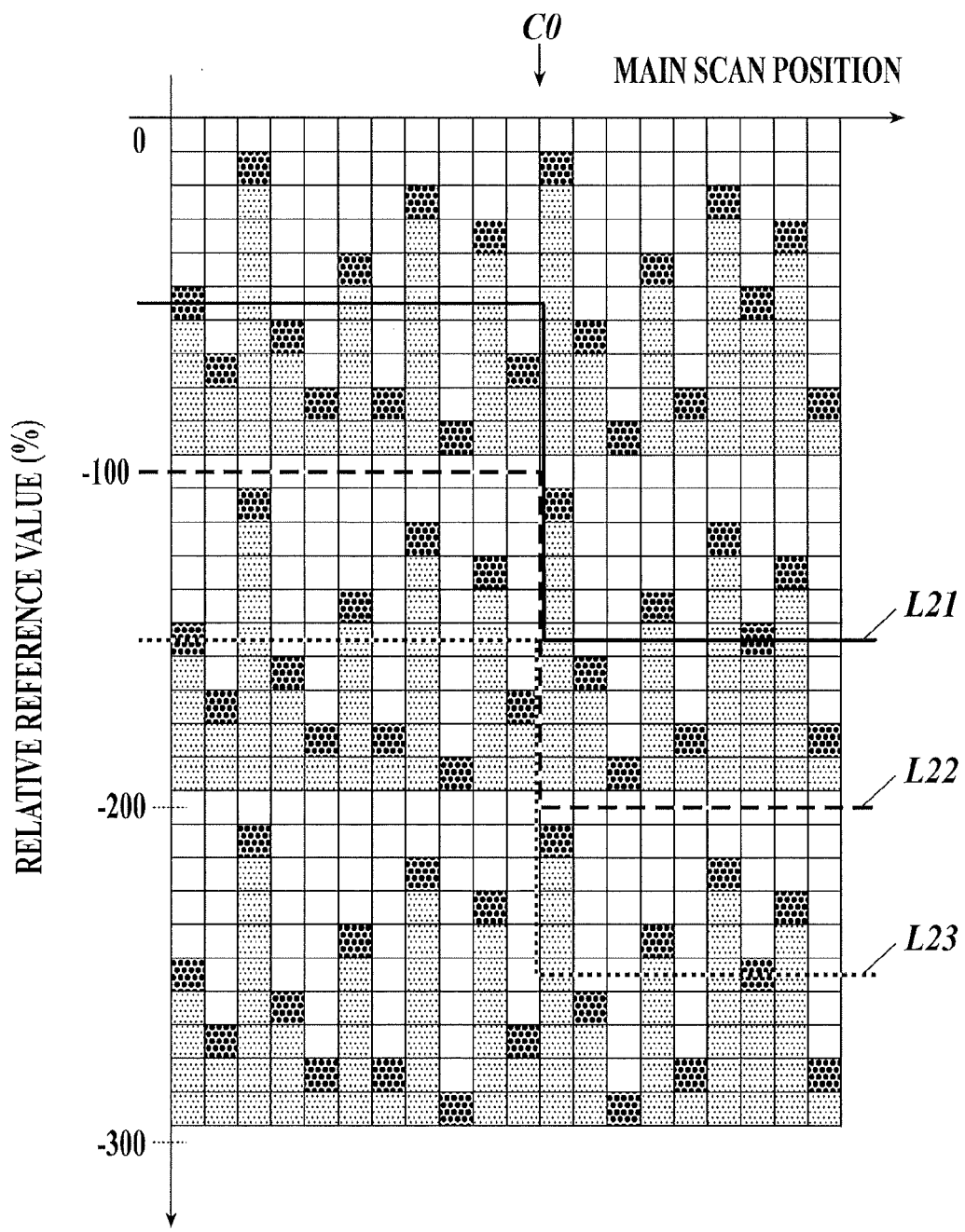
FIG. 19 shows reference positions in the pixel-dispersion reference table for processing a certain line in the main scan direction.

FIG. 19 shows a case where the step position of the table-reference line is shifted right by one pixel in comparison with the case in FIG. 17.

Figure 20A:
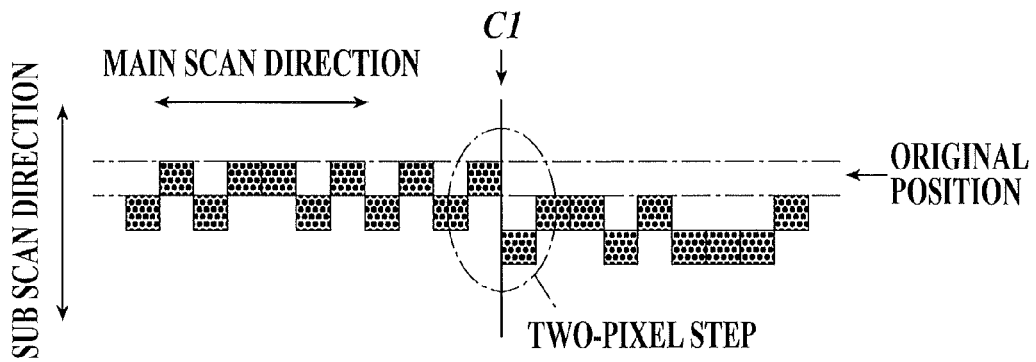
FIG. 20A shows a form obtained by processing a narrow line using a table-reference line L21.
Figure 20B:
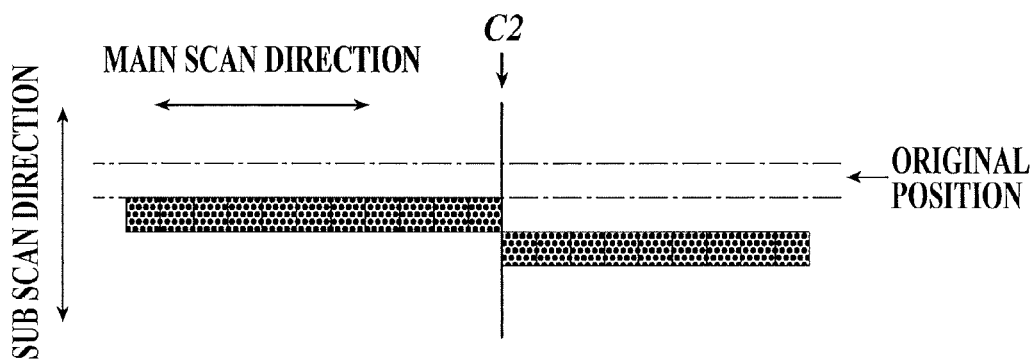
FIG. 20B shows a form obtained by processing the narrow line using a table-reference line L22.
Figure 20C:
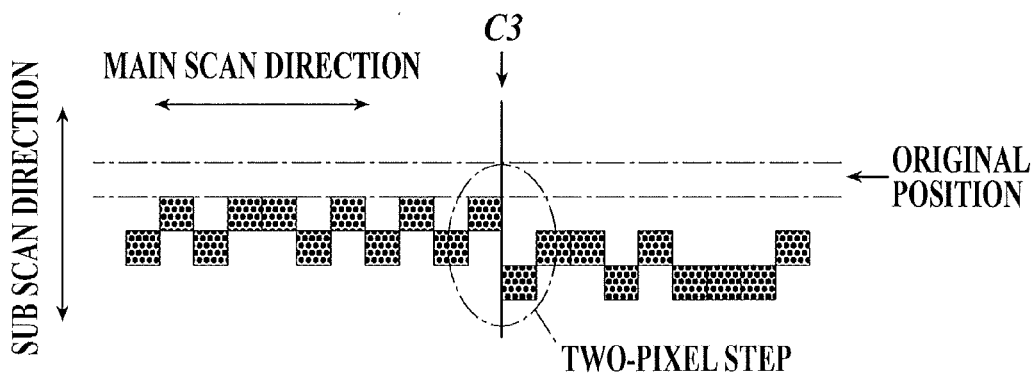
FIG. 20C shows a form obtained by processing the narrow line using a table-reference line L23.

FIG. 20A, FIG. 20B and FIG. 20C show forms obtained by executing processing on a narrow line near an image line using the table-reference lines L21, L22, L23 in FIG. 19. In each of FIG. 20A, FIG. 20B and FIG. 20C, two chain lines show pixel positions when pixels are not shifted. Also, the positions shown with arrows C1, C2 and C3 in FIG. 20A, FIG. 20B and FIG. 20C correspond to positions (arrow C0) of steps in the table-reference lines L21, L22, L23.

In FIG. 19, as a reference position in the table is shifted from the table-reference line L21 through the table-reference line L22 to the table-reference line L23, a case where the narrow line is made rough by pixel dispersion (FIG. 20A and FIG. 20C) and a case where the narrow line is made to be step-shaped (FIG. 20B) alternate. A two-pixel step is caused in each of FIG. 20A and FIG. 20C. Dividing of the narrow line may cause deterioration of picture quality.

Figure 21:
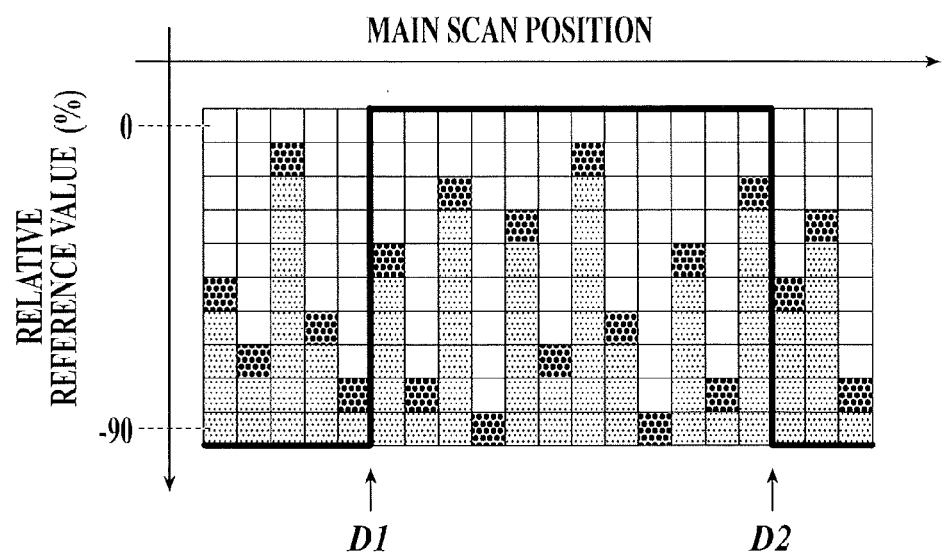
FIG. 21 shows a relation between directions of steps in the table-reference line and values in the pixel-dispersion reference table.

To avoid the two-pixel steps in FIG. 20A and FIG. 20C, the step position of the table-reference line, that is to say, the position of the shift-border in the simple deformation-correction processing in the sub scan direction, is adjusted in relation to the pixel-dispersion reference table. Specifically, a relative and positional relation between a direction of the step in the table-reference line (a direction causing a step rising toward right or a direction causing a step declining toward right) and a value in the pixel-dispersion reference table (position of the black box) is made to be the one like the relation shown in FIG. 21. That is to say, if a large/small relation between the relative reference values indicated by the table-reference line is the same as the large/small relation between the values in the pixel-dispersion reference table at pixel positions adjoining in the main scan direction on the both sides of a position of a step in the table-reference line, a two-pixel step is not caused by steps caused in the slight-magnification pixel-dispersion processing and by steps caused in the simple deformation-correction processing. For example, at two adjoining pixel positions on the both sides of the position shown with the arrow D1, the table-reference line indicates relative reference values "−100%" and "0%", and values in the pixel-dispersion reference table are "−80%" and "−40%". Thus the values have the same large/small relations. Also, at the pixel positions on the both sides of the position shown with the arrow D2, the table-reference line indicates relative reference values "0%" and "−100%", and values in the pixel-dispersion reference table are "−20%" and "−50%". Thus the values have the same large/small relations.

Figure 22A:
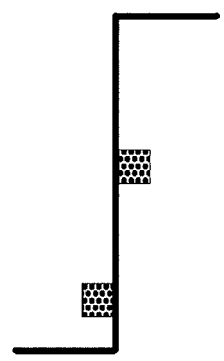
FIG. 22A illustrates a relation between the pixel-dispersion reference table and the table-reference line which does not cause a two-pixel step at a position of pixels adjoining in the main scan direction.
Figure 22B:
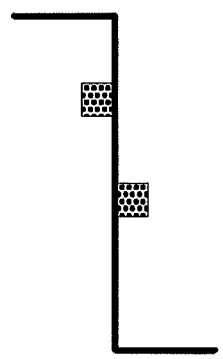
FIG. 22B illustrates a relation between the pixel-dispersion reference table and the table-reference line which does not cause a two-pixel step at a position of pixels adjoining in the main scan direction.

Each of FIG. 22A and FIG. 22B shows a relation between the pixel-dispersion reference table and the table-reference line which does not cause a two-pixel step at a position of pixels adjoining in the main scan direction.

Next, operation of the image-processing device according to the second embodiment will be explained.

FIG. 23 is a flowchart of image-modification processing according to the second embodiment. In this processing, the slight-magnification pixel-dispersion processing in the sub scan direction is executed as the first image-modification processing, and the simple deformation-correction processing in the sub scan direction is executed as the second image-modification processing. A magnification ratio in the slight magnification processing in the sub scan direction and a correction value for correcting deformation in the simple deformation-correction processing in the sub scan direction are calculated in advance and are stored in the storage unit 15.

First, the adjustment unit 21 executes the second adjustment processing wherein a position of the shift-border in the simple deformation-correction processing in the sub scan direction is adjusted on the basis of positions of steps in the image which can be caused in the slight-magnification pixel-dispersion processing in the sub scan direction (Step S21).

The second adjustment processing will be explained referring to FIG. 24.

The adjustment unit 21 obtains the pixel-dispersion table from the storage unit 15 (Step S31).

Next, the adjustment unit 21 determines a position of the shift-border and a direction in which pixels are shifted in the simple deformation-correction processing in the sub scan direction on the basis of the correction value for correcting deformation in the simple deformation-correction processing in the sub scan direction stored in the storage unit 15. Then the adjustment unit 21 determines whether a two-pixel step can be caused at the position of the shift-border in the simple deformation-correction processing in the sub scan direction on the basis of the pixel-dispersion reference table (Step S32). Specifically, when a relation between the pixel-dispersion reference table and the table-reference line corresponds to the relation shown in FIG. 22A or FIG. 22B at a position of pixels adjoining in the main scan direction on the both sides of the position of the shift-border in the simple deformation-correction processing in the sub scan direction, the adjustment unit 21 determines that there is no possibility of causing a two-pixel step.

When determining that a two-pixel step can be caused at the position of the shift-border in the simple deformation-correction processing in the sub scan direction (Step S32: YES), the adjustment unit 21 moves the position of the shift-border in the simple deformation-correction processing in the sub scan direction to a position where a two-pixel step is not caused (Step S33). That is to say, the adjustment unit 21 moves the position of the step in the table-reference line to a position where a two-pixel step is not caused.

When determining that a two-pixel step cannot be caused at the position of the shift-border in the simple deformation-correction processing in the sub scan direction at Step S32 (Step S32: NO), the adjustment unit 21 does not change the position of the shift-border in the simple deformation-correction processing in the sub scan direction (Step S34).

After Step S33 or Step S34, the image-modification processing unit 20 executes the slight-magnification pixel-dispersion processing in the sub scan direction as the first image-modification processing and the simple deformation-correction processing in the sub scan direction as the second image-modification processing at the same time referring to the pixel-dispersion reference table (Step S22) as shown in FIG. 23. Specifically, the image-modification processing unit 20 adds, for each pixel, the relative reference value based on the slight-magnification pixel-dispersion processing in the sub scan direction to the relative reference value based on the simple deformation-correction processing in the sub scan direction (the relative reference value after the position of the shift-border is adjusted in the second adjustment processing). Then the image-modification processing unit 20 obtains reference-pixel information related to a pixel position in the main scan direction and to an added value of relative reference values, that is to say, information indicating which pixel in the subject image is referred to for a pixel value in the output image, from the pixel-dispersion reference table stored in the storage unit 15. Then the image-modification processing unit 20 executes the slight-magnification pixel-dispersion processing in the sub scan direction and the simple deformation-correction processing in the sub scan direction at the same time on the basis of the obtained reference-pixel information.

Then the image-deformation processing according to the second embodiment ends.

As described above, according to the second embodiment, a position of the shift-border in the second image modification processing is adjusted such that a level difference of a step at the position of the shift-border in an image which is caused in the first image-modification processing is not widened in the second image-modification processing. Therefore deterioration of picture quality is prevented when several kinds of image-modification processing are executed on an image.

Further, the first image-modification processing and the second image-modification processing can be executed at the same time by using the pixel-dispersion reference table.

In FIG. 23, a case where the slight-magnification pixel-dispersion processing in the sub scan direction is executed as the first image-modification processing and where the simple deformation-correction processing in the sub scan direction is executed as the second image-modification processing is explained. However, it is also possible that the slight-magnification pixel-dispersion processing in the main scan direction is executed as the first image-modification processing and that the simple deformation-correction processing in the main scan direction is executed as the second image-modification processing.

Third Embodiment

Next, the third embodiment according to the present invention will be explained.

The configuration of the image processing device according to the third embodiment is the same as the image processing device 10 shown in the first embodiment. Therefore, by referring to FIG. 1, figures and explanations are omitted. Hereinafter, configuration and processing characteristic of the third embodiment will be explained.

The image-modification processing unit 20 executes the first image-modification processing wherein pixels are inserted or deleted in the first direction to or from a subject image and the second image-modification processing wherein pixels in the subject image are shifted in the second direction.

The adjustment unit 21 adjusts a position of the shift-border along which the pixels are shifted in the second image modification processing on the basis of positions of steps caused in the first image-modification processing.

In the third embodiment, the second direction is perpendicular to the first direction.

The adjustment unit 21 adjusts the position of the shift-border such that the shift-border does not overlap with a portion which is included in an image obtained by executing the first image-modification processing on the subject image and which corresponds to a line extending in a direction substantially the same as the second direction in the subject image. The "line extending in a direction substantially the same as the second direction" includes not only a line extending in a direction exactly the same as the second direction but also lines which makes an angle no more than a predetermined degrees (for example, an incline of ⅙, which is about 9.5 degrees) with the second direction. The "line extending in a direction substantially the same as the second direction" is, for example, a narrow line having a width of one pixel to three pixels. However, the width is not limited to this.

The first image-modification processing includes processing wherein pixels are inserted to or deleted from the subject image in the first direction such that positions to or from which pixels are inserted or deleted vary with lines along the first direction (see FIG. 4 and FIG. 5).

The first image-modification processing includes processing wherein pixels are shifted in the first direction to correct a deformation in the first direction while positions of steps in an image caused by the shift of the pixels are dispersed (see FIG. 7C).

The second image-modification processing includes processing wherein deformation is corrected in the second direction.

Next, operation of the image-processing device according to the third embodiment will be explained.

Figure 25:
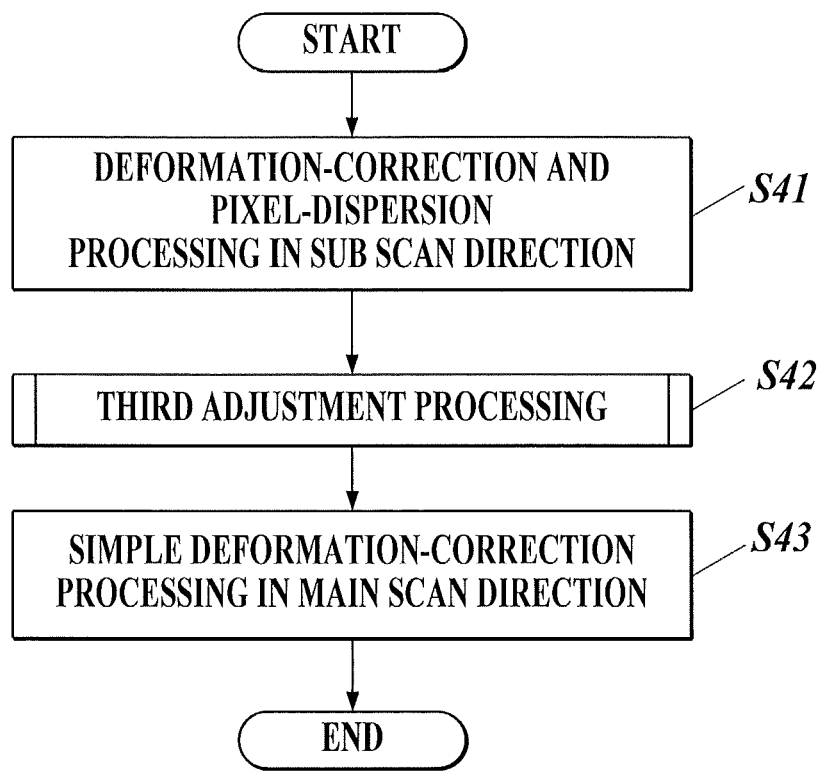
FIG. 25 is a flowchart of image-modification processing according to the third embodiment.

FIG. 25 is a flowchart of image-modification processing according to the third embodiment. In this processing, the deformation-correction and pixel-dispersion processing in the sub scan direction is executed as the first image-modification processing, and the simple deformation-correction processing in the main scan direction is executed as the second image-modification processing. A correction value for correcting deformation in the deformation-correction and pixel-dispersion processing in the sub scan direction and a correction value for correcting deformation in the simple deformation-correction processing in the main scan direction are calculated in advance and are stored in the storage unit 15.

First, the image-modification processing unit 20 executes deformation-correction and pixel-dispersion processing in the sub scan direction as the first image-modification processing on the subject image on the basis of a correction value for correcting deformation in the deformation-correction and pixel-dispersion processing in the sub scan direction (Step S41). Specifically, as shown in FIG. 7C, the image-modification processing unit 20 disperses positions of steps in the image which is caused by shift of pixels in the sub scan direction for correcting deformation in the sub scan direction.

Next, the adjustment unit 21 executes the third adjustment processing wherein the position of the shift-border in the simple deformation-correction processing in the main scan direction is adjusted on the basis of positions of steps in the image which is caused in the deformation-correction and pixel-dispersion processing in the sub scan direction (Step S42).

Figure 26:
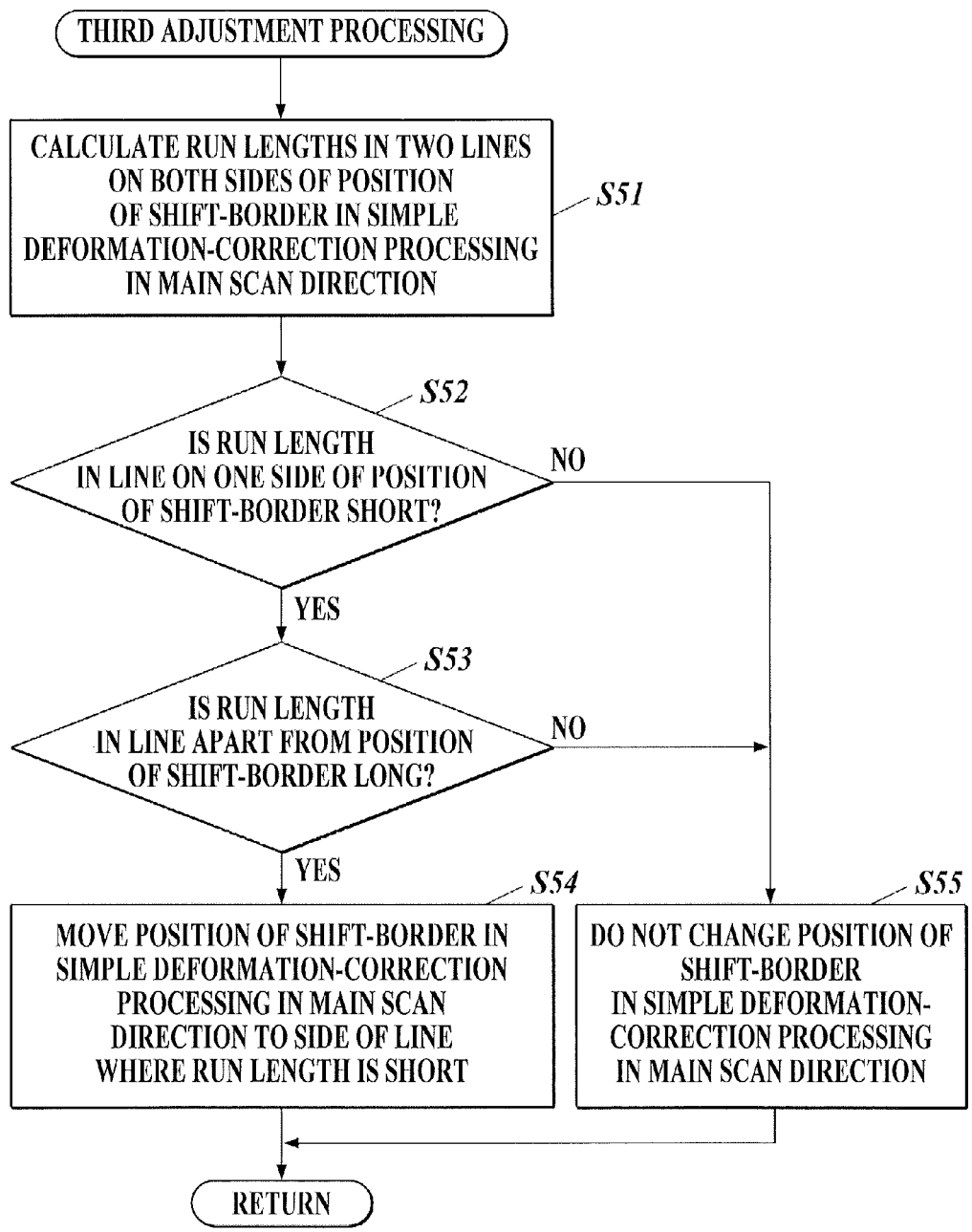
FIG. 26 is a flowchart of the third adjustment processing.

The third adjustment processing will be explained referring to FIG. 26.

The adjustment unit 21 calculates run lengths in two lines (pixel lines extending in the main scan direction) on the both sides of the shift-border in the simple deformation-correction processing in the main scan direction (Step S51). A run length is the number of successive black pixels or successive white pixels in the direction along the line.

Next, the adjustment unit 21 determines whether or not a run length of one line on either side of the shift-border is shorter than the first predetermined length (Step S52). For example, a length of four pixels or less is used as the first length.

When determining that a run length of one line on either side of the shift-border is shorter than the first length (Step S52: YES), the adjustment unit 21 determines whether or not the run length of a line apart from the position of the shift-border on the side of the line, the run length in which is determined to be shorter than the first length, is no less than the second predetermined length (Step S53). For example, a length of six pixels or more is used as the second length.

When determining that the run length of the line apart from the position of the shift-border is no less than the second predetermined length (Step S53: YES), the adjustment unit 21 moves the shift-border in the simple deformation-correction processing in the main scan direction to the side of the line, the run length in which is determined to be shorter than the first length at Step S52 (Step S54).

When determining that the run lengths of the lines on the both sides of the shift-border are shorter than the first length or no less than the first length at Step S52 (Step S52: NO), or determining that the run length of the line apart from the shift-border is less than the second length at Step S53 (Step S53: NO), the adjustment unit 21 does not change the shift-border in the simple deformation-correction processing in the main scan direction (Step S55). For example, if run lengths on the both sides of the shift-border are long, no rough edge having one-pixel steps exists there. There is no need to change the position of the shift-border.

After Step S54 or Step S55, the image-modification processing unit 20 executes the simple deformation-correction processing in the main scan direction as the second image-modification processing on the subject image on the basis of the position of the shift-border which is adjusted in the third adjustment processing (Step S43) as shown in FIG. 25.

Then the image-modification processing according to the third embodiment ends.

The roughness of the edge which is caused at limited positions in the deformation-correction and pixel-dispersion processing is one-pixel in height at the largest. Therefore the position of the shift-border in the simple deformation-correction processing in the direction perpendicular to the direction of the deformation-correction and pixel-dispersion processing is moved to be away from the edge by one pixel. Whether or not the position of the shift-border is needed to be moved in the simple deformation-correction processing is easily determined on the basis of whether or not the shift-border traverses the rough edge having one-pixel steps.

Figure 27A:
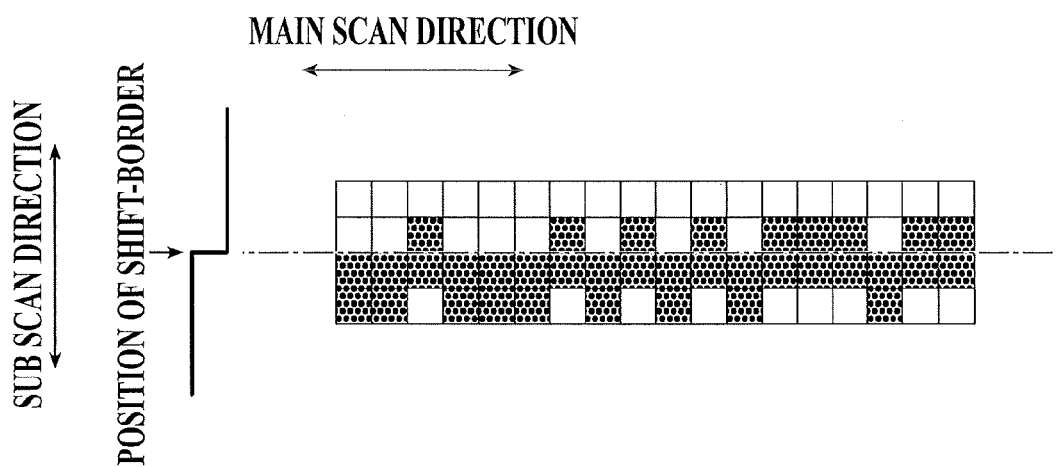
FIG. 27A shows an example of an image after the deformation-correction and pixel-dispersion processing in the sub scan direction is executed.
Figure 27B:
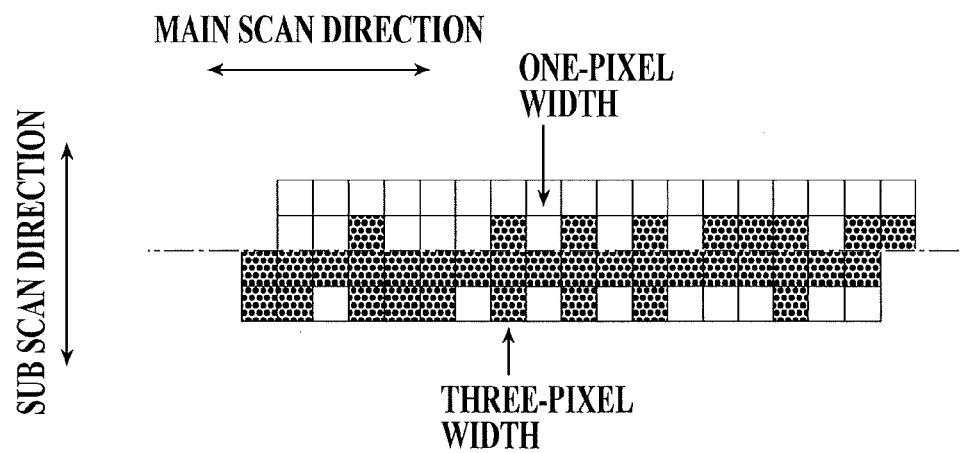
FIG. 27B shows an example wherein a relation between rough patterns on the upper and lower sides of a narrow line is changed.

FIG. 27A shows an example image obtained by executing the deformation-correction and pixel-dispersion processing in the sub scan direction on a subject image including a line of two-pixel width extending in the main scan direction. In the example of FIG. 27A, the run length (black pixels) in the line on the lower side of shift-border (the chain line in the figure) in the simple deformation-correction processing in the main scan direction is long while the run length in the line on the upper side is not long. If pixels are shifted in the main scan direction keeping this position, a portion of three-pixel width and a portion of one-pixel width are caused in a narrow line in the image which originally has a two-pixel width so that a relation between rough patterns on the upper and lower sides of the narrow line is changed from the original as shown in FIG. 27B.

In FIG. 27A, the run length (white pixels) in the line upwardly apart from the shift-border (the chain line in the figure) is long. Since the position of the shift-border corresponds to the rough edge having one-pixel steps, the position of the shift-border is moved to the side of the line, the run length in which is not long (upper side).

Figure 28A:
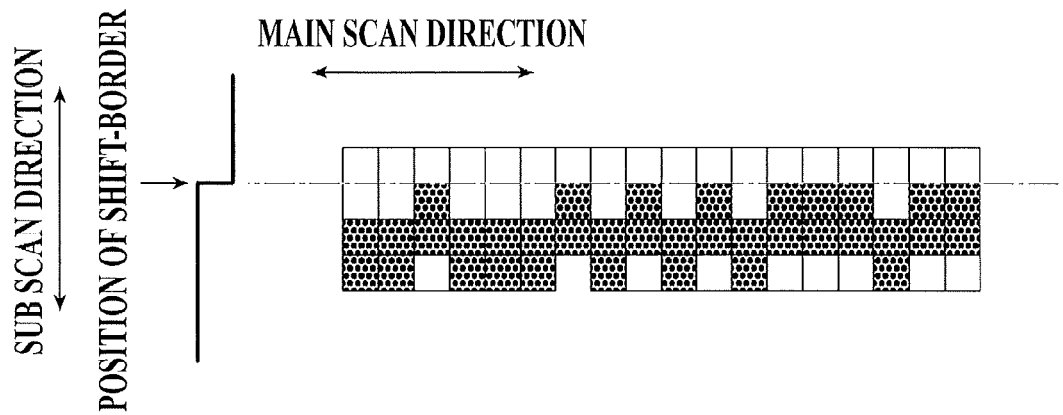
FIG. 28A shows an example wherein, after the deformation-correction and pixel-dispersion processing in the sub scan direction is executed on an image, a position of the shift-border in the simple deformation-correction processing in the main scan direction is moved.
Figure 28B:
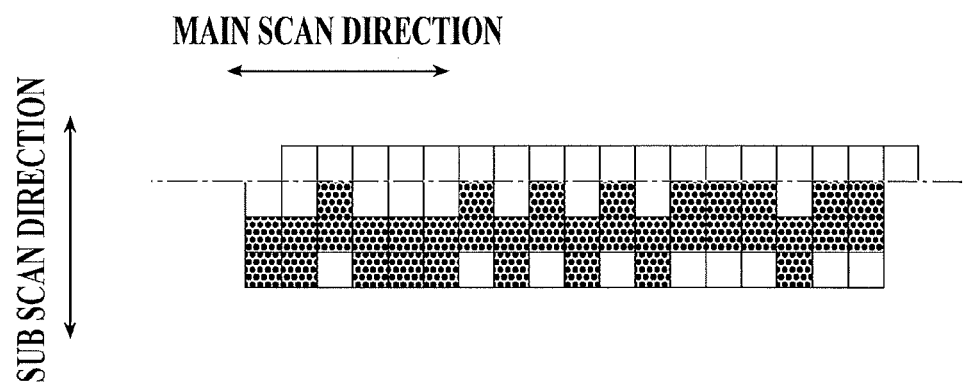
FIG. 28B shows an example wherein the relation between rough patterns on the upper and lower sides of the narrow line is maintained even after the simple deformation-correction processing in the main scan direction.

As shown in FIG. 28A, the position of the shift-border in the simple deformation-correction processing in the main scan direction is moved to the side of the line, the run length in which is not long. Thereby, as shown in FIG. 28B, pixels are shifted in the main scan direction at a position wherein the shift does not affect the narrow line. That is to say, the position of the shift-border in the simple deformation-correction processing in the main scan processing is adjusted such that the shift-border does not overlap with a portion which is included in an image after the deformation-correction and pixel-dispersion processing in the sub scan direction and which corresponds to the line having two-pixel width in the subject image. Thereby the relation between rough patterns on the upper and lower sides of the narrow line is maintained even after the simple deformation-correction processing in the main scan direction.

As described above, according to the third embodiment, the position of the shift-border in the second image-modification processing is adjusted such that the shift-border in the second image-modification processing does not overlap with a portion which is included in an image obtained by executing the first image-modification processing on the subject image and which corresponds to a line extending in a direction substantially the same as the second direction in the subject image. Therefore deterioration of picture quality is prevented when several kinds of image-modification processing are executed on an image. That is to say, the position of the shift-border in the second image-modification processing is moved such that shift of pixels does not affect the relation between the both edges of a narrow line in the image. Thereby the narrow line is reproduced without being affected.

In FIG. 25, the deformation-correction and pixel-dispersion processing in the sub scan direction is executed as the first image-modification processing. However, it is also possible to execute the slight-magnification pixel-dispersion processing in the sub scan direction as the first image-modification processing. Further, it is also possible to execute both the slight-magnification pixel-dispersion processing and the deformation-correction and pixel-dispersion processing in the sub scan direction as the first image-modification processing. The main scan direction and the sub scan direction are exchangeable in the above examples.

The above embodiments are examples of an image processing device according to the present invention, and the scope of the invention is not limited to the above embodiments. Configuration details and operation details of each part in the device can be modified within scope of the present invention.

This U.S. patent application claims priority to Japanese patent application No. 2013-002362 filed on Jan. 10, 2013, the entire contents of which are incorporated by reference herein for correction of incorrect translation.

What is claimed is:

1. An image processing device, comprising:
    an image-modification processing unit which executes first image-modification processing wherein pixels are inserted to or deleted from a subject image in a first direction or pixels in the subject image are shifted in the first direction and second image modification processing wherein pixels in the subject image are shifted in a second direction, which is the same as the first direction; and
    an adjustment unit which adjusts a position of a shift-border along which the pixels are shifted in the second image-modification processing on the basis of a position of each step in an image caused in the first image-modification processing,
    wherein the adjustment unit adjusts the position of the shift-border such that a level difference of a step at the position of the shift-border in an image which is caused in the first image-modification processing is not widened in the second image-modification processing.

2. The image processing device according to claim 1, further comprising:
a storage unit which stores a reference table in which each pixel position in a direction perpendicular to the first direction is related to reference pixel information which indicates which pixel in the subject image is referred to for a pixel value of an output image for each relative reference value, the output image being obtained by executing the first image-modification processing and/or the second image-modification processing on the subject image, wherein the relative reference value indicates a relative position in the subject image in relation to a position in the output image in the first direction,
wherein the image-modification processing unit adds the relative reference value based on the second image-modification processing to the relative reference value based on the first image-modification processing for each pixel, obtains reference pixel information relating to the pixel position in the direction perpendicular to the first direction and to an added value of the relative reference values from the reference table stored in the storage unit, and executes the first image-modification processing and the second image-modification processing at the same time on the basis of the obtained reference pixel information.

3. The image processing device according to claim 1, wherein the first image-modification processing includes processing wherein pixels are inserted to or deleted from the subject image in the first direction such that positions to or from which pixels are inserted or deleted vary with lines along the first direction.

4. The image processing device according to claim 1, wherein the second image-modification processing includes processing wherein deformation is corrected in the second direction.

* * * * *